I

(12) United States Patent
Miyata et al.

(10) Patent No.: US 8,688,292 B2
(45) Date of Patent: Apr. 1, 2014

(54) MOTION STABILIZER FOR TRACTOR

(71) Applicants: Nissin Kogyo Co., Ltd., Ueda (JP); Honda Motor Co., Ltd., Tokyo (JP)

(72) Inventors: Kazuaki Miyata, Ueda (JP); Takeshi Kojima, Saitama (JP); Tomoyuki Futamura, Saitama (JP)

(73) Assignees: Honda Motor Co., Ltd., Tokyo (JP); Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 13/851,145

(22) Filed: Mar. 27, 2013

(65) Prior Publication Data

US 2013/0261840 A1    Oct. 3, 2013

(30) Foreign Application Priority Data

Mar. 30, 2012    (JP) ................... 2012-081084

(51) Int. Cl.
  *G05D 1/00* (2006.01)
  *B60G 17/018* (2006.01)
  *B60G 17/016* (2006.01)
  *G06F 7/70* (2006.01)

(52) U.S. Cl.
  USPC ............ 701/1; 701/37; 701/38; 701/50

(58) Field of Classification Search
  None
  See application file for complete search history.

(56) References Cited

U.S. PATENT DOCUMENTS

| | | | |
|---|---|---|---|
| 6,494,281 B1 | 12/2002 | Faye et al. | |
| 7,376,499 B2* | 5/2008 | Salman et al. | 701/30.2 |
| 7,798,263 B2* | 9/2010 | Tandy et al. | 180/14.6 |
| 7,878,605 B2* | 2/2011 | Kokubo et al. | 303/151 |
| 8,180,543 B2 | 5/2012 | Futamura et al. | |
| 8,326,504 B2* | 12/2012 | Wu et al. | 701/69 |
| 2006/0125313 A1* | 6/2006 | Gunne et al. | 303/7 |
| 2009/0005946 A1* | 1/2009 | Futamura et al. | 701/70 |
| 2009/0105906 A1* | 4/2009 | Hackney et al. | 701/38 |

FOREIGN PATENT DOCUMENTS

| | | |
|---|---|---|
| DE | 10 2008 042 914 | 4/2009 |
| EP | 2 008 892 | 12/2008 |
| JP | 2002-503185 | 1/2002 |
| JP | 2009-12488 | 1/2009 |
| WO | WO 99/51475 | 10/1999 |
| WO | WO 2004/048171 | 6/2004 |

* cited by examiner

*Primary Examiner* — Vivek Koppikar
*Assistant Examiner* — Kelly E Darby
(74) *Attorney, Agent, or Firm* — Hamre, Schumann, Mueller & Larson, P.C.

(57) ABSTRACT

A pendular motion determination unit of a motion stabilizer for a tractor includes a parameter computation unit configured to compute a determination parameter PA indicative of a quantity of change in an actual yaw rate Y, a threshold value setting unit configured to compute a threshold value PAth for the determination parameter PA, and a determination unit configured to determine that a pendular motion caused by swaying motion of a trailer is imparted, if the determination parameter PA is greater than the threshold value PAth. At least one of PAth and PA is changed based upon a correlation of a value related to a lateral acceleration based yaw rate Yg with a value related to the standard yaw rate Ys and a correlation of a value related to the actual yaw rate Y with a value related to the standard yaw rate Ys.

7 Claims, 13 Drawing Sheets

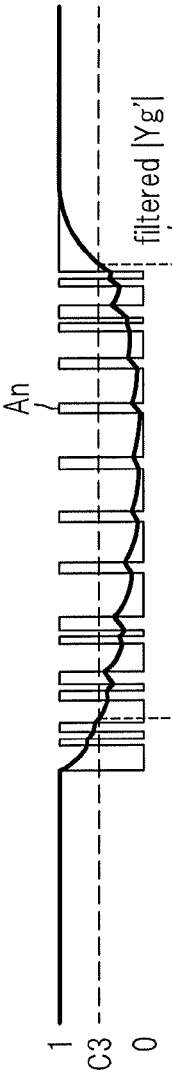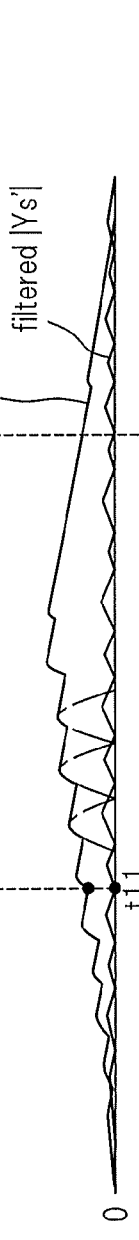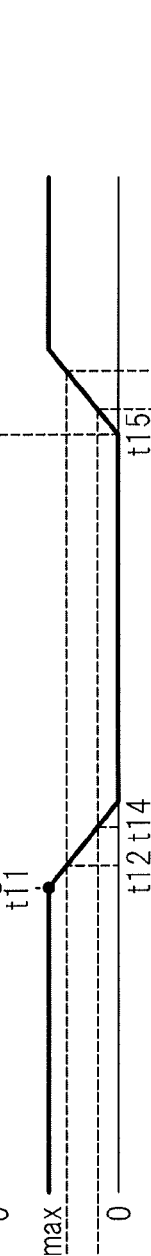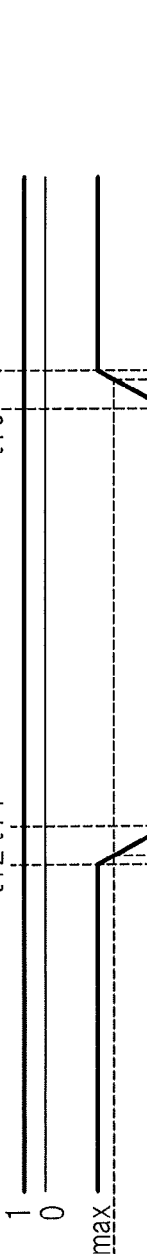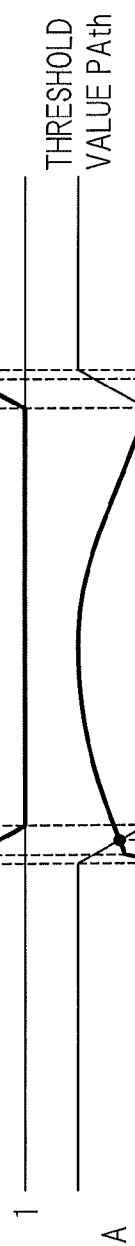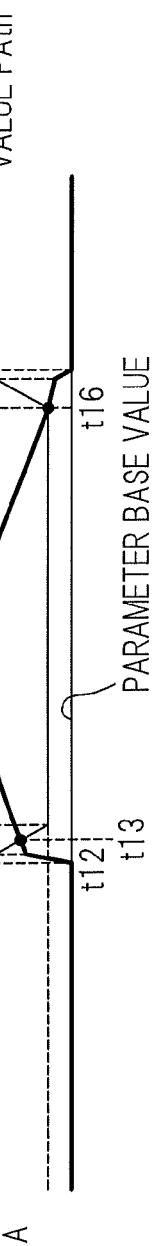
FIG.11

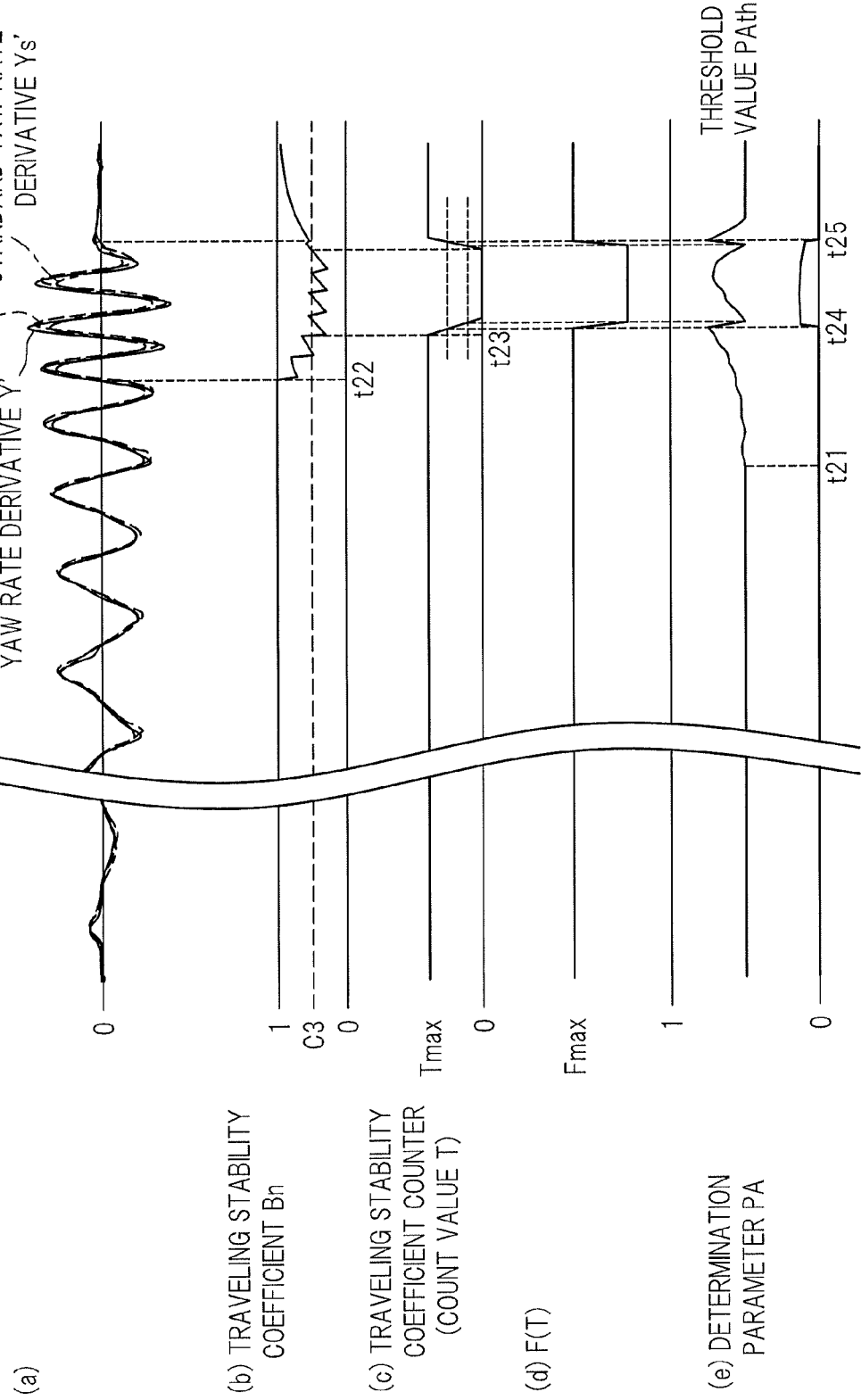

MOTION STABILIZER FOR TRACTOR

CROSS-REFERENCE TO RELATED APPLICATION(S)

This application claims priority from Japanese Patent Application No. 2012-081084 filed on Mar. 30, 2012, the disclosure of which is incorporated herein by reference in its entirety.

BACKGROUND

The present invention relates generally to a motion stabilizer for a tractor, and particularly to a motion stabilizer in which a pendular motion of a tractor for pulling a trailer can be detected.

A trailer pulled by a tractor tends to make a side-to-side (transverse) swaying motion for some conspired reasons such as the case in which the trailer is loaded improperly. Such a swaying motion of the trailer causes the rear of the tractor to sway from side to side, making the traveling of the tractor unstable. In order to reduce the risk of undermining the traveling stability of the tractor due to the swaying motion of the trailer, JP 2002-503185 A (also published under WO99/51475A and U.S. Pat. No. 6,494,281 B1) proposes to detect a dangerous traveling condition, i.e., to determine that a pendular motion of the tractor due to the swaying motion of the trailer has occurred, if a characteristic value for a quantity describing the transverse dynamics of the tractor is greater than a threshold value, and to activate a brake upon its detection.

However, with this configuration which determines that the pendular motion of the tractor due to the swaying motion of the trailer has occurred, if the characteristic value for a quantity describing the transverse dynamics of the tractor is greater than the threshold value, the pendular motion would possibly be detected erroneously because slaloming of the tractor which is not pulling a trailer (hereinafter referred to as "in the no-traction state") would similarly generate great yaw rates repeatedly.

With this in view, there is a need of accurately detecting the pendular motion of the tractor due to the swaying motion of the trailer by determining whether or not a change in yaw rate observed in the tractor is derived from the swaying motion of the trailer.

SUMMARY

In one aspect, a motion stabilizer for a combined vehicle including a tractor and a trailer connected (swingably in a lateral direction) to the tractor is provided.

In another aspect, a motion stabilizer for a tractor to which a trailer is connectible is provided.

According to one or more embodiments, a motion stabilizer is proposed which comprises a yaw rate acquisition unit, a lateral acceleration acquisition unit, a steering angle acquisition unit, a vehicle speed acquisition unit, a lateral acceleration based yaw rate computation unit, a standard yaw rate computation unit, and a pendular motion determination unit. The yaw rate acquisition unit is configured to acquire an actual yaw rate of the tractor. The lateral acceleration acquisition unit is configured to acquire a lateral acceleration of the tractor. The steering angle acquisition unit is configured to acquire a steering angle of the tractor. The vehicle speed acquisition unit is configured to acquire a vehicle speed of the tractor. The lateral acceleration based yaw rate computation unit is configured to compute a lateral acceleration based yaw rate that is a yaw rate estimated based upon the lateral acceleration and the vehicle speed. The standard yaw rate computation unit is configured to compute a standard yaw rate from the steering angle and the vehicle speed. The pendular motion determination unit is configured to determine whether or not a pendular motion caused by a swaying motion of the trailer is imparted to the tractor. The pendular motion determination unit includes a parameter computation unit, a threshold value setting unit, and a determination unit. The parameter computation unit is configured to compute a determination parameter indicative of a quantity of change in the actual yaw rate. The threshold value setting unit is configured to compute a threshold value for the determination parameter. The determination unit is configured to determine that the pendular motion caused by the swaying motion of the trailer is imparted, if the determination parameter is greater than the threshold value. The pendular motion determination unit is configured to make a change to at least one of the threshold value and the determination parameter based upon a correlation of a value related to the lateral acceleration based yaw rate with a value related to the standard yaw rate and a correlation of a value related to the actual yaw rate with a value related to the standard yaw rate.

When the tractor makes a pendular motion due to the swaying motion of the trailer, the tractor steers to the left or to the right but this motion is passive, and thus the steering (timing) goes out of phase with the lateral acceleration based yaw rate, likely to result in countersteering. When the tractor makes a pendular motion due to the swaying motion of the trailer, the steering angle is small and thus the standard yaw rate is likely to become smaller than the lateral acceleration based yaw rate or the actual yaw rate. On the other hand, when the tractor in the non-traction state slaloms, the actual yaw rate, the standard yaw rate and the lateral acceleration based yaw rate are phased at the same side and likely to exhibit substantially the same value. With these in view, the above-described configuration in which the presence or absence of the influence of the swaying motion of the trailer on the pendular motion of the tractor can be determined based upon at least one of the correlation of the value related to the lateral acceleration based yaw rate with the value related to the standard yaw rate and the correlation of the value related to the actual yaw rate with the value related to the standard yaw rate, and thus the change in the actual yaw rate of the tractor that is not derived from the swaying motion of the trailer can be discriminated from the change in the actual yaw rate caused by the swaying motion of the trailer by changing at least one of the threshold value and the determination parameter. In other words, the risk (probability) of error in determination of the pendular motion of the tractor caused by swaying motion of the trailer can be diminished.

In the motion stabilizer described above, each value related to the yaw rate (standard yaw rate, lateral acceleration based yaw rate and actual yaw rate) may have a first sign exhibited when the tractor turns leftward or has a second sign, opposite to the first sign, exhibited when the tractor turns rightward. Herein, additionally, the change made by the pendular motion determination unit to the at least one of the threshold value and the determination parameter may be based upon a first condition which provides that the value related to the lateral acceleration based yaw rate and the value related to the standard yaw rate have the same sign, such that a probability of the determination being made that the pendular motion caused by the swaying motion of the trailer is imparted is reduced if the first condition is satisfied.

As described above, the lateral acceleration based yaw rate and the standard yaw rate tend to be phased oppositely (i.e., yawing moments acting in opposite directions) when the pendular motion is imparted to the tractor due to the swaying motion of the trailer, but tend to be phased to the same side (i.e., yawing moments acting in the same direction) when the tractor in the non-traction state is slaloming. Therefore, if the first condition which provides that the value related to the lateral acceleration based yaw rate and the value related to the standard yaw rate have the same sign is satisfied, it is likely that the tractor is slaloming in the non-traction state. Accordingly, the possibility of occurrence of an error in determination as to whether or not the pendular motion is imparted to the tractor by the swaying motion of the trailer can be reduced by making a change (to the at least one of the threshold value and the determination parameter) such that the probability of the determination being made that the pendular motion caused by the swaying motion of the trailer is imparted is reduced.

In the motion stabilizer described above, with or without the aforementioned additional feature, the change made by the pendular motion determination unit to the at least one of the threshold value and the determination parameter may be based upon a second condition which provides that an absolute value of a difference between the value related to the standard yaw rate and the value related to the lateral acceleration based yaw rate is smaller than a first predetermined value and an absolute value of a difference between the value related to the standard yaw rate and the value related to the actual yaw rate is smaller than a second predetermined value, such that a probability of the determination being made that the pendular motion caused by the swaying motion of the trailer is imparted is reduced if the second condition is satisfied.

As described above, when the pendular motion is imparted to the tractor due to the swaying motion of the trailer, the amount of steering (standard yaw rate) is relatively small, but the actual yaw rate and the lateral acceleration based yaw rate tend to increase, so that their differences from the standard yaw rate increase. In contrast, when the tractor in the no-traction state is slaloming, the lateral acceleration based yaw rate and the actual yaw rate approach the standard yaw rate. Therefore, if the above-described second condition (that the absolute value of the difference between the value related to the standard yaw rate and the value related to the lateral acceleration based yaw rate is smaller than the first predetermined value and the absolute value of the difference between the value related to the standard yaw rate and the value related to the actual yaw rate is smaller than the second predetermined value) is satisfied, it is likely that the tractor is slaloming in the non-traction state. Accordingly, the possibility of occurrence of an error in determination as to whether or not the pendular motion is imparted to the tractor by the swaying motion of the trailer can be reduced by making a change (to the at least one of the threshold value and the determination parameter) such that the probability of the determination being made that the pendular motion caused by the swaying motion of the trailer is imparted is reduced.

In the motion stabilizer described above, with or without one or more of the aforementioned additional features, the change made by the pendular motion determination unit to the at least one of the threshold value and the determination parameter may be based upon a third condition which provides that an absolute value of the value related to the standard yaw rate is greater than an absolute value of the value related to the lateral acceleration based yaw rate, such that a probability of the determination being made that the pendular motion caused by the swaying motion of the trailer is imparted is reduced if the third condition is satisfied.

When the tractor slaloms on a road having a low coefficient of friction, the lateral acceleration would not become so great relative to the large amount of steering. Therefore, if the third condition (that the absolute value of the value related to the standard yaw rate is greater than the absolute value of the value related to the lateral acceleration based yaw rate) is satisfied, it is likely that the tractor is slaloming on a road having a low coefficient of friction. Accordingly, the possibility of occurrence of an error in determination as to whether or not the pendular motion is imparted to the tractor by the swaying motion of the trailer can be reduced by making a change (to the at least one of the threshold value and the determination parameter) such that the probability of the determination being made that the pendular motion caused by the swaying motion of the trailer is imparted is reduced.

In the motion stabilizer described above, where each value related to the yaw rate (standard yaw rate, lateral acceleration based yaw rate and actual yaw rate) has a first sign exhibited when the tractor turns leftward or has a second sign, opposite to the first sign, exhibited when the tractor turns rightward, according to an alternative and more specific embodiment, the threshold value setting unit may be configured to determine a trailer factor coefficient and to compute the threshold value by multiplying the trailer factor coefficient by a parameter base value that is a predetermined coefficient. Herein, the trailer factor coefficient is a value which increases if at least one of a first condition, a second condition and a third condition is satisfied, and decreases if all of the first condition, the second condition and the third condition are not satisfied, where the first condition provides that the value related to the lateral acceleration based yaw rate and the value related to the standard yaw rate have the same sign, the second condition provides that an absolute value of a difference between the value related to the standard yaw rate and the value related to the lateral acceleration based yaw rate is smaller than a first predetermined value and an absolute value of a difference between the value related to the standard yaw rate and the value related to the actual yaw rate is smaller than a second predetermined value, and the third condition provides that an absolute value of the value related to the standard yaw rate is greater than an absolute value of the value related to the lateral acceleration based yaw rate.

In this configuration, the threshold value setting unit may include a traveling stability coefficient computing unit configured to compute a traveling stability coefficient which increases if at least one of the first condition and the second condition is satisfied, and decreases if none of the first condition and the second condition are satisfied, and a traveling stability coefficient counter configured to increment a count value if the traveling stability coefficient is greater than a third predetermined value or the third condition is satisfied, and to decrement the count value if the traveling stability coefficient is not greater than the third predetermined value and the third condition is not satisfied, wherein the trailer factor coefficient determined by the threshold value setting unit is a value increasing with the count value.

In the motion stabilizer described above, with or without one or more of the aforementioned additional features, the value related to the lateral acceleration based yaw rate may be a value obtained by differentiation of the lateral acceleration yaw rate, the value related to the standard yaw rate may be a value obtained by differentiation of the standard yaw rate, and the value related to the actual yaw rate may be a value obtained by differentiation of the actual yaw rate.

With this additional feature, even when the tractor is turning (cornering), or when a zero drift observed in the output signal level of the sensor, the values obtained by differentiation of the yaw rates are not affected by these circumstances, and thus determination can be made adequately as to whether or not the pendular motion of the tractor is imparted due to the swaying motion of the trailer.

To sum up, the risk of an erroneous determination as to whether or not the tractor is making a pendular motion due to the swaying motion of the trailer can be reduced.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which:

FIG. 11 is a timing chart showing changes effected in parameters when a pendular motion caused by a swaying motion of a trailer is imparted;

FIG. 13 is a timing chart showing changes effected in parameters when periodical steering-back maneuvers are made in the no-traction state.

DETAILED DESCRIPTION OF THE EMBODIMENTS

A detailed description will be given of an illustrative embodiment of the present invention with reference to the drawings.

Figure 1:
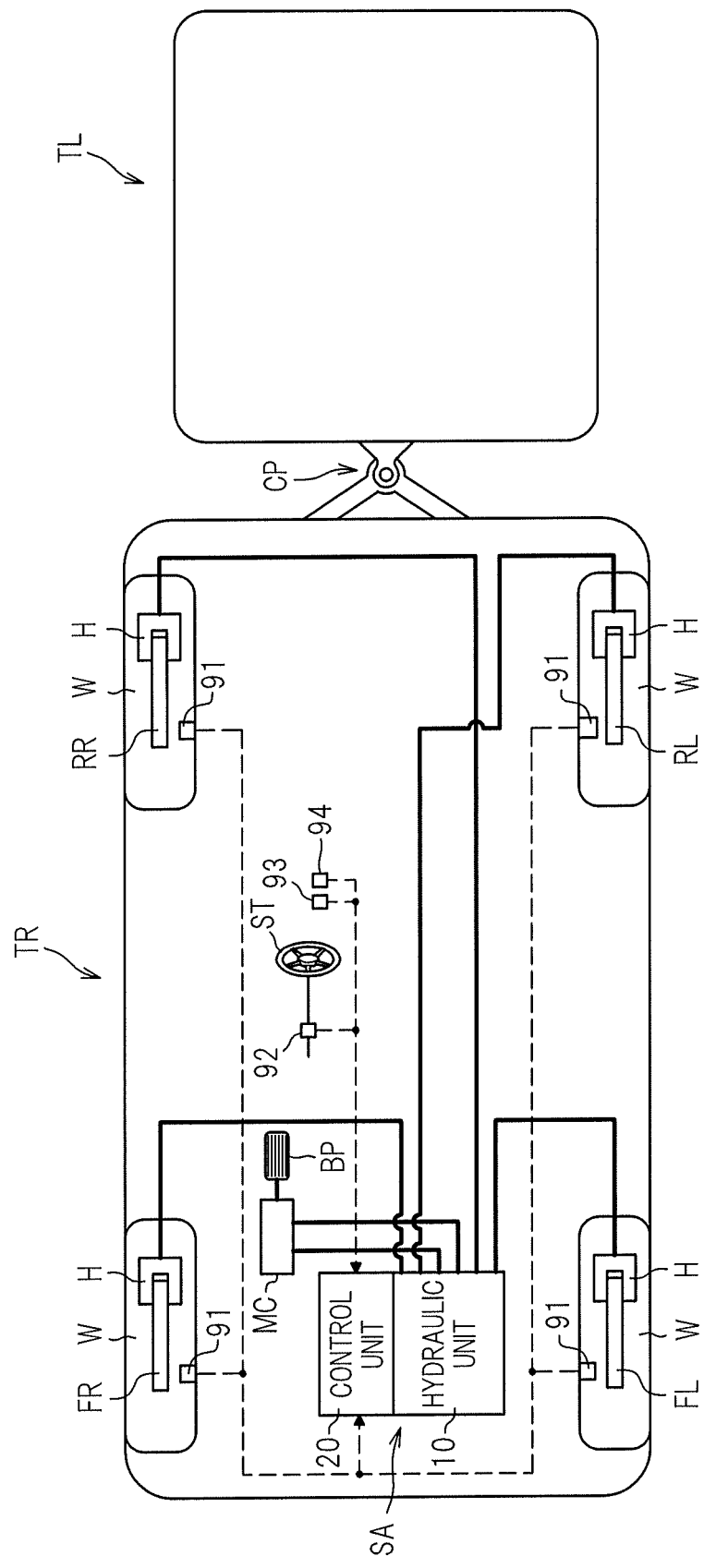
FIG. 1 is a schematic representation of a combined vehicle including a motion stabilizer for a tractor according to one illustrative embodiment.

As shown in FIG. 1, a motion stabilizer SA is an apparatus for controlling a braking force (hydraulic pressure for braking) applied to each wheel W of a tractor TR. The motion stabilizer SA mainly includes a hydraulic unit 10 including hydraulic lines (hydraulic circuit) and various parts, and a control unit 20 configured to exercise control over the various parts provided in the hydraulic unit 10. To the tractor TR, a trailer TL is connected swingably in a lateral direction, via a coupler CP.

To the control unit 20, wheel speed sensors 91 configured to detect wheel speeds of the wheels W, a steering angle sensor 92 configured to detect a steering angle of a steering wheel ST, a lateral acceleration sensor 93 configured to detect an acceleration acting in the lateral (transverse) direction of the tractor TR (lateral acceleration), and a yaw rate sensor 94 configured to detect an actual yaw rate of the tractor TR are connected. The detection outputs of these sensors 91-94 are provided to the control unit 20.

The control unit 20 includes, for example, a central processing unit (CPU), a random access memory (RAM), a read-only memory (ROM), and an input/output circuit. The control unit 20 is configured to exercise control by executing various operations/computations (processing) based upon input data from the wheel speed sensors 91, the steering angle sensor 92, the lateral acceleration sensor 93 and the yaw rate sensor 94, and programs and data stored in the ROM.

Wheel cylinders H are hydraulic systems configured to convert a hydraulic pressure for braking generated by a master cylinder MC and the motion stabilizer SA into driving forces for wheel brakes FR, FL, RR, RL provided at the respective wheels W, and are connected to the hydraulic unit 10 of the motion stabilizer SA through piping. The master cylinder MC is a hydraulic pressure source configured to generate a hydraulic pressure for braking, which varies according to a depressing force applied by the driver to the brake pedal BP.

Figure 2:
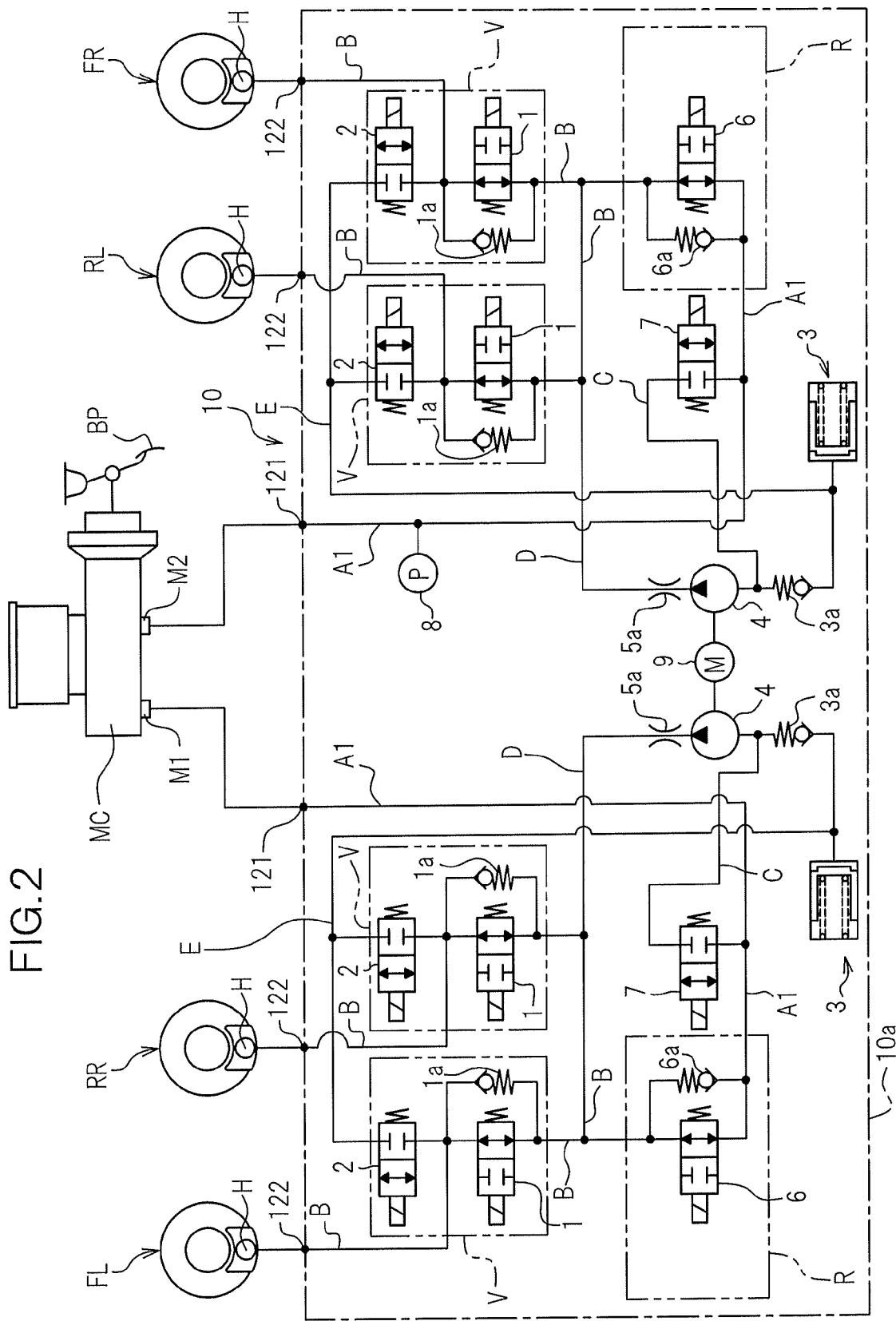
FIG. 2 is a schematic diagram of a brake hydraulic circuit for the motion stabilizer.

As shown in FIG. 2, the hydraulic unit 10 is disposed between the master cylinder MC and the wheel brakes FR, FL, RR, RL. The hydraulic unit 10 includes a pump body 10a that is a base body having hydraulic lines for circulation of the brake fluid. The hydraulic unit 10 further includes various parts such as inlet valves 1 and outlet valves 2 disposed on the hydraulic lines.

The master cylinder MC has two output ports M1, M2 connected to inlet ports 121 of the pump body 10a, which has outlet ports 122 connected to the wheel brakes FR, FL, RR, RL, respectively. During the normal operation, the hydraulic lines from the inlet ports 121 to the outlet ports 122 in the pump body 10a are open in fluid communication throughout so that the depressing force applied to the brake pedal BP is transmitted to the wheel brakes FL, RR, RL, FR.

The hydraulic line extending from the output port M1 is in communication with the front left wheel brake FL and the rear right wheel brake RR, and the hydraulic line extending from the output port M2 is in communication with the front right wheel brake FR and the rear left wheel brake RL. In the following discussion, the hydraulic line extending from the output port M1 will be referred to as "first system", and the hydraulic line extending from the output port M2 will be referred to as "second system".

The hydraulic unit 10 includes four control valve devices V of which two devices V corresponding to the wheel brakes FL, RR are provided in the first system, and two devices V corresponding to the wheel brake RL, FR are provided in the second system. The hydraulic unit 10 also includes two sets of a reservoir 3, a pump 4, an orifice 5a, a pressure-regulating valve assembly (regulator) R, and a suction valve 7, of which one set is provided in the first system and the other set is provided in the second system. The hydraulic unit 10 further includes a common motor 9 for driving the pump 4 of the first system and the pump 4 of the second system. This motor 9 is configured to be rpm controllable; that is, the rotation speed of the motor 9 can be controlled. In this embodiment, the hydraulic unit 10 further includes a pressure sensor 8 which is however provided only in the second system.

Hereinbelow, the hydraulic lines extending from the output ports M1, M2 of the master cylinder MC to the pressure-regulating valve assemblies R will be referred to as "output hydraulic line(s) A1", the hydraulic line extending from the pressure-regulating valve assembly R of the first system to the wheel brakes FL, RR and the hydraulic line extending from the pressure-regulating valve assembly R of the second system to the wheel brakes RL, FR will be referred to, respectively, as "wheel hydraulic line(s) B". The hydraulic lines extending from the output hydraulic line A1 to the pumps 4 will be referred to, respectively, as "suction hydraulic line C", and the hydraulic lines extending from the pumps 4 to the wheel hydraulic lines B will be referred to, respectively, as "discharge hydraulic line(s) D", and the hydraulic lines extending from the wheel hydraulic lines B to the suction hydraulic lines C will be referred to, respectively, as "release line(s) E".

The control valve devices V are valve units configured to control transmission of the hydraulic pressure from the master cylinder MC or the pumps 4 to the wheel brakes FL, RR, RL, FR (specifically, wheel cylinders H thereof). The control valve devices V are configured to increase, maintain and decrease the pressures of the wheel cylinders H. For that purpose, each control valve device V includes an inlet valve 1, an outlet valve 2 and a check valve 1a.

The inlet valve 1 is a normally open solenoid valve provided in the wheel hydraulic to line B between each of the wheel brakes FL, RR, RL, FR and the master cylinder MC. The inlet valve 1 is configured to be normally open so as to permit transmission of the hydraulic pressure for braking from the master cylinder MC to the wheel brake FL, FR, RL, RR. The inlet valve 1 is also configured to be closed when the wheel W comes close to lockup, under control of the control unit 20 so as to interrupt transmission of the hydraulic pressure for braking from the brake pedal BP to the wheel brake FL, FR, RL, RR.

The outlet valve 2 is a normally closed solenoid valve provided between each wheel brake FL, RR, RL, FR and a corresponding reservoir 3, that is between the wheel hydraulic line B and the release line E. The outlet valve 2 is configured to be normally closed, and to be opened when the wheel W comes close to lockup, under control of the control unit 20 so as to release the hydraulic pressure for braking which would act on the corresponding wheel brake FL, FR, RL, RR into the corresponding reservoir 3.

Each check valve 1a is connected in parallel to a corresponding inlet valve 1. This check valve 1a is a one-way valve configured to permit a flow of brake fluid only in one direction from the wheel brake FL, FR, RL, RR to the master cylinder MC. When the depressing force of the brake pedal BP is released with the inlet valve 1 kept closed, the brake fluid is permitted to flow from the wheel brake FL, FR, RL, RR to the master cylinder MC through the check valve 1a.

The reservoir 3 is provided on the release line E, and configured to absorb the hydraulic pressure for braking released by opening the outlet valve 2. A check valve 3a configured to permit a flow of brake fluid only in one direction from the reservoir 3 to the pump 4 is provided between the reservoir 3 and the pump 4.

The pump 4 is provided between one end of the suction hydraulic line C of which the other end is connected to the output hydraulic line A1 and one end of the discharge hydraulic line D of which the other end is connected to the wheel hydraulic line B, and configured to suck the brake fluid stored in the reservoir 3 and discharge the sucked brake fluid into the discharge hydraulic line D. With this arrangement, not only can the brake fluid sucked in the reservoir 3 be returned back to the master cylinder MC, but also can a braking force be produced for the wheel brake FL, RR, RL, FR by generating a hydraulic pressure for braking.

The quantity of the brake fluid discharged by the pump 4 depends on the rotation speed (rpm) of the motor 9. For example, the greater the rotation speed of the motor 9, the larger the quantity of the brake fluid discharged by the pump 4 becomes.

The orifice 5a is configured to serve to damp pulsation of pressure in the brake fluid discharged from the pump 4 and pulsation caused by the operation of the pressure-regulating valve assembly R which will be described below.

The pressure-regulating valve assembly R is normally open to permit a flow of brake fluid from the output hydraulic line A1 to the wheel hydraulic line B. Moreover, the pressure-regulating valve assembly R is configured to interrupt a flow of brake fluid when the pressure in the wheel cylinder H is to be increased by the hydraulic pressure for braking generated by the pump 4, and is further configured to regulate the pressures in the discharge hydraulic line D, the wheel hydraulic line B and the wheel cylinder H to a set value or smaller. For that purpose, each pressure-regulating valve assembly R includes a switch valve 6 and a check valve 6a.

The switch valve 6 is a normally open linear solenoid valve disposed between one end of the output hydraulic line A1 of which the other end is connected to the master cylinder MC and one end of the wheel hydraulic line B of which the other end is connected to the wheel brake FL, FR, RL, RR. Although not illustrated in detail, the valve body of the switch valve 6 is biased toward the wheel hydraulic line B and the wheel cylinder H by an electromagnetic force which varies according to an electric current supplied thereto. Thus, if the pressure in the wheel hydraulic line B is greater than the pressure in the output hydraulic line A1 by a predetermined value or greater (this predetermined value varies depending on the electric current supplied), the brake fluid is released from the wheel hydraulic line B to the output hydraulic line A1 so that the pressure in the wheel hydraulic line B is regulated to the predetermined value.

Each check valve 6a is connected in parallel to the corresponding switch valve 6. This check valve 6a is a one-way valve configured to permit a flow of brake fluid from the output hydraulic line A1 to the wheel hydraulic line B.

The suction valve 7 is a normally closed solenoid valve provided in the suction hydraulic line C, and configured to switch the suction hydraulic line C to an open state or to a closed state. The suction valve 7 is released (opened) under control of the control unit 20, if the switch valve 6 is closed, that is, when a hydraulic pressure for braking is applied to each wheel brake FL, FR, RL, RR without the driver's operation of the brake pedal BP.

The pressure sensor 8 is configured to detect (measure) a hydraulic pressure for braking in the output hydraulic line A1 in the second system. The results of detection of the pressure sensor 8 are provided to the control unit 20.

Figure 3:
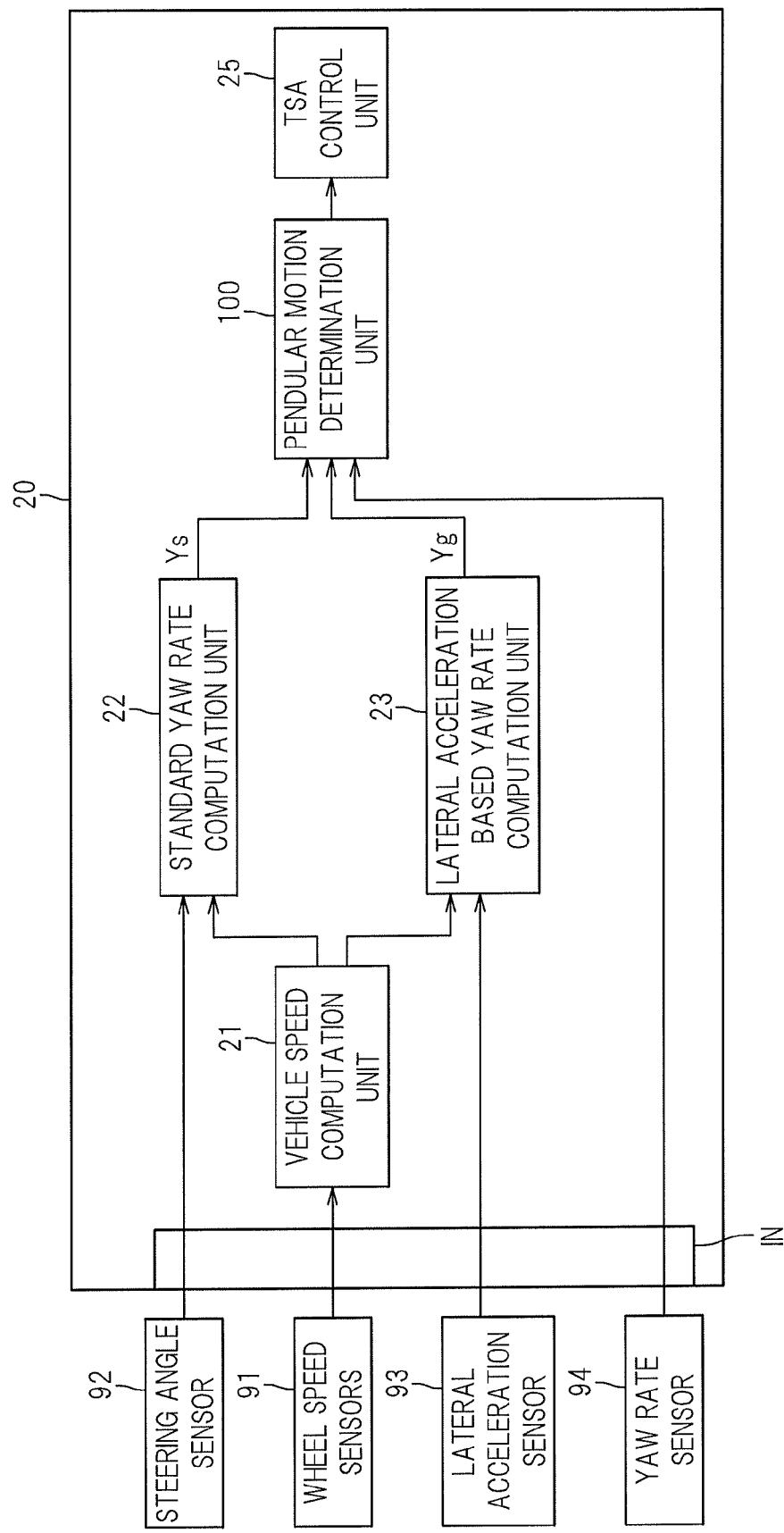
FIG. 3 is a block diagram showing a general configuration of the motion stabilizer.

The next discussion focuses on the control unit 20. As shown in FIG. 3, the control unit 20 includes an input interface IN for receiving detection signals from wheel speed sensors 91, a steering angle sensor 92, a lateral acceleration sensor 93, and a yaw rate sensor 94. The input interface IN in this embodiment serves as a steering angle acquisition unit, a lateral acceleration acquisition unit and a yaw rate acquisition unit. The control unit 20 exercise control over the open/close operations of the control valve devices V, the switch valves 6 (pressure-regulating valve assemblies R) and suction valves 7, and the operation of the motor 9, based upon signals received from the wheel speed sensors 91, the steering angle sensor 92, the lateral acceleration sensor 93 and the yaw rate sensor 94, so that the operations of the wheel brakes FL, RR, RL, FR are regulated. The control unit 20 includes a vehicle speed computation unit 21, a standard yaw rate computation unit 22, a lateral acceleration based yaw rate computation unit 23, a pendular motion determination unit 100, a TSA control unit 25, and a memory unit (not shown).

The vehicle speed computation unit 21 is an example of a vehicle speed acquisition unit, and configured to compute a vehicle speed of the tractor TR. To be more specific, the vehicle speed computation unit 21 is configured to obtain a peripheral velocity of each wheel based upon signals received from the wheel speed sensors 91, and to compute a vehicle speed from the obtained wheel speeds (peripheral velocities) by a known method.

The standard yaw rate computation unit 22 is configured to compute a standard yaw rate Ys that is a yaw rate reflecting a driver's steering intention, based upon signals on a vehicle speed computed by the vehicle speed computation unit 21 and a steering angle received through the input interface IN from the steering angle sensor 92. The standard yaw rate Ys may be computed by a known method. Thus-computed standard yaw rate Ys is outputted to the pendular motion determination unit 100.

The lateral acceleration based yaw rate computation unit 23 is configured to compute a lateral acceleration based yaw rate Yg that is a yaw rate estimated from a lateral acceleration imparted to the tractor TR, based upon signals on a vehicle speed computed by the vehicle speed computation unit 21 and a lateral acceleration received through the input interface IN from the lateral acceleration sensor 93. The lateral acceleration based yaw rate Yg may be computed by a known method. Thus-computed lateral acceleration based yaw rate Yg is outputted to the pendular motion determination unit 100.

The pendular motion determination unit 100 is configured to determine whether or not a pendular motion caused by a swaying motion of the trailer TL is imparted to the tractor TR. A specific configuration of the pendular motion determination unit 100 will be described later. The result of determination made by the pendular motion determination unit 100 is outputted to the TSA (Trailer Stability Assist) control unit 25.

The TSA control unit 25 is configured to exercise control over the motor 9 and the valves in the hydraulic unit 10 described above if the pendular motion determination unit 100 determines that the pendular motion caused by a swaying motion of the trailer TL is imparted to the tractor TR, so as to apply a braking force to one or more wheels W selected adequately among the wheels W, thereby stabilizing the motion of the tractor TR and the trailer TL.

Determination as to which wheel(s) W is to be subjected to the braking and what time the braking force is applied thereto may be made appropriately by a known method without limitation. For example, a yaw moment directed toward a side reverse to a yaw moment imparted to a wheel W at that instant may be produced to the relevant wheel W in accordance with a method disclosed in JP 2009-012488 A (also published under US 2009/0005946 A1 which issued later under U.S. Pat. No. 8,180,543 B2).

Figure 4:
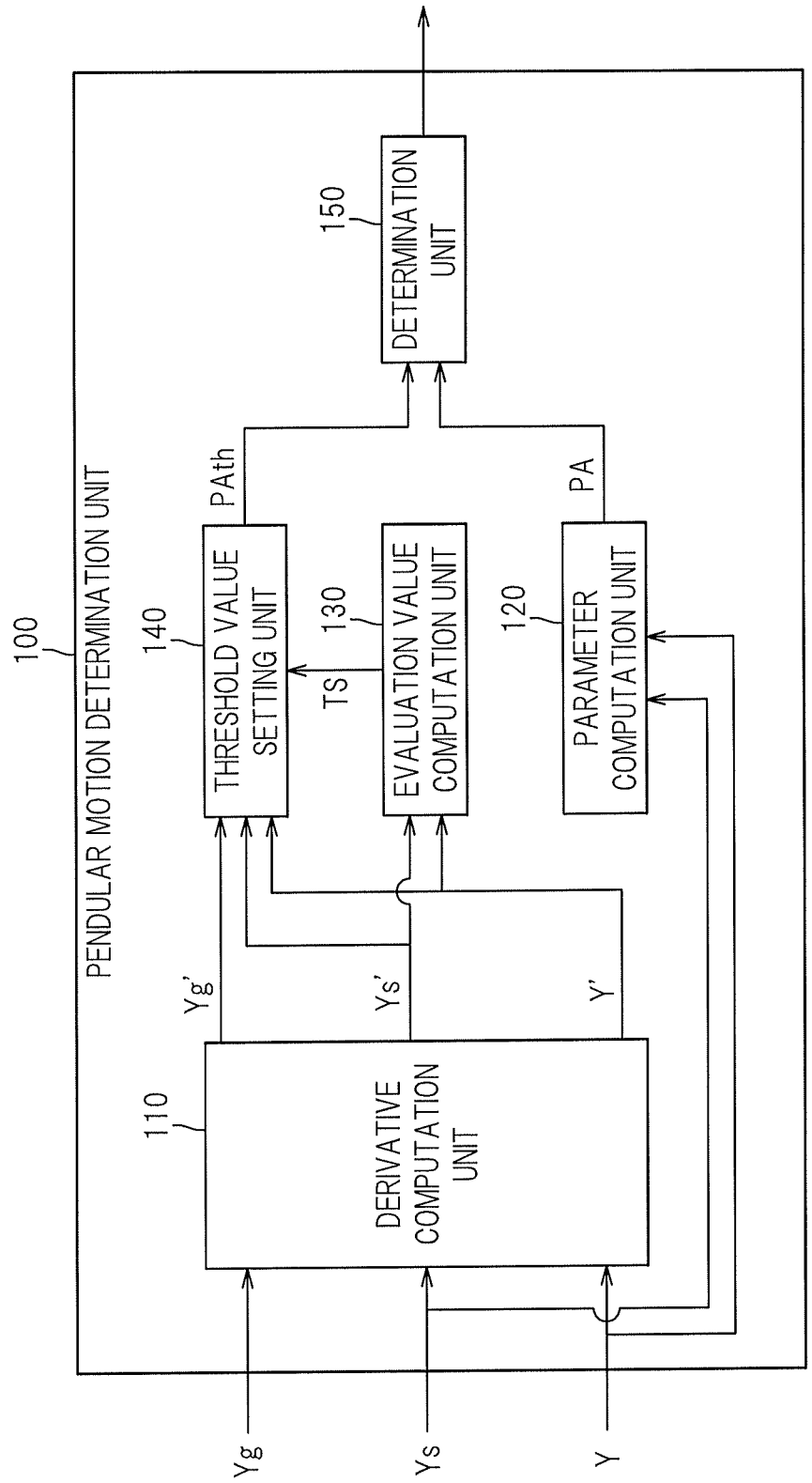
FIG. 4 is a block diagram of a pendular motion determination unit.

As shown in FIG. 4, the pendular motion determination unit 100 includes a derivative computation unit 110, a parameter computation unit 120, an evaluation value computation unit 130, a threshold value setting unit 140 and a determination unit 150.

The derivative computation unit 110 is configured to receive a standard yaw rate Ys, a lateral acceleration based yaw rate Yg and an actual yaw rate Y, and to compute derivatives thereof with respect to time, to obtain a standard yaw rate derivative Ys', a lateral acceleration based yaw rate derivative Yg', and an actual yaw rate derivative Y', by differentiation. The obtained lateral acceleration based yaw rate derivative Yg' is outputted to the threshold value setting unit 140, and the obtained standard yaw rate derivative Ys' and the obtained actual yaw rate derivative Y' are outputted to the evaluation value computation unit 130 and the threshold value setting unit 140.

The parameter computation unit 120 is configured to compute a determination parameter PA indicative of a quantity of change in the actual yaw rate Y. In this embodiment, the determination parameter PA is computed by using the actual yaw rate Y and the standard yaw rate Ys. The method for computing the determination parameter PA may, for example, include low-pass filtering an absolute value of a difference (yaw rate deviation) between the standard yaw rate Ys and the actual yaw rate Y. In the present embodiment, although a detailed description is omitted, the determination parameter PA is maintained at 0 (zero) until a trailer factor coefficient K becomes smaller than Kmax, while the determination parameter PA takes a value obtained by low-pass filtering an absolute value of the yaw rate deviation if the trailer factor coefficient K becomes a predetermined value $K_1$ or smaller. The method of computing the determination parameter PA which may be applicable is not limited to this, and thus the determination parameter PA may be computed by filtering (e.g., by a low-pass filter so as to remove abrupt fluctuations) an absolute value of a phase-adjusted value of the actual yaw rate derivative Y' as disclosed in JP 2009-012488 A, or by filtering an absolute value of the actual yaw rate Y (to obtain a value corresponding to an amplitude). The computed determination parameter PA is outputted to the determination unit 150.

The evaluation value computation unit 130 is configured to compute a steering-back maneuver evaluation value TS indicative of the possibility of making periodical steering-back maneuvers, based upon at least one of a value related to the actual yaw rate Y and a value related to the standard yaw rate Ys. In this embodiment, the evaluation value computation unit 130 is configured to compute the steering-back maneuver evaluation value TS based upon the standard yaw rate derivative Ys' and the actual yaw rate derivative Y'. The steering-back maneuver evaluation value TS is a value that tends to increase when the tractor TR in the no-traction state (i.e., not pulling a trailer TL) is slaloming on a road having a high coefficient of friction. A specific configuration for computation will be described later.

The threshold value setting unit 140 is configured to compute a threshold value PAth for the determination parameter PA, based upon the standard yaw rate derivative Ys', the lateral acceleration based yaw rate derivative Yg' and the actual yaw rate derivative Y', to obtain a reference value for use in determination as to whether or not a pendular motion of the tractor TR caused by a swaying motion of the trailer TL is imparted to the tractor TR. In the present embodiment, the threshold value setting unit 140 is configured to set a greater threshold value PAth if there is a strong possibility that the yaw rate of the tractor TR is changing by any factor other than the swaying motion of the trailer TL. A specific configuration and operation of the threshold value setting unit 140 will be described later.

The determination unit 150 is configured to determine that a pendular motion caused by the swaying motion of the trailer is imparted, if the determination parameter PA is greater than the threshold value PAth.

Figure 5:
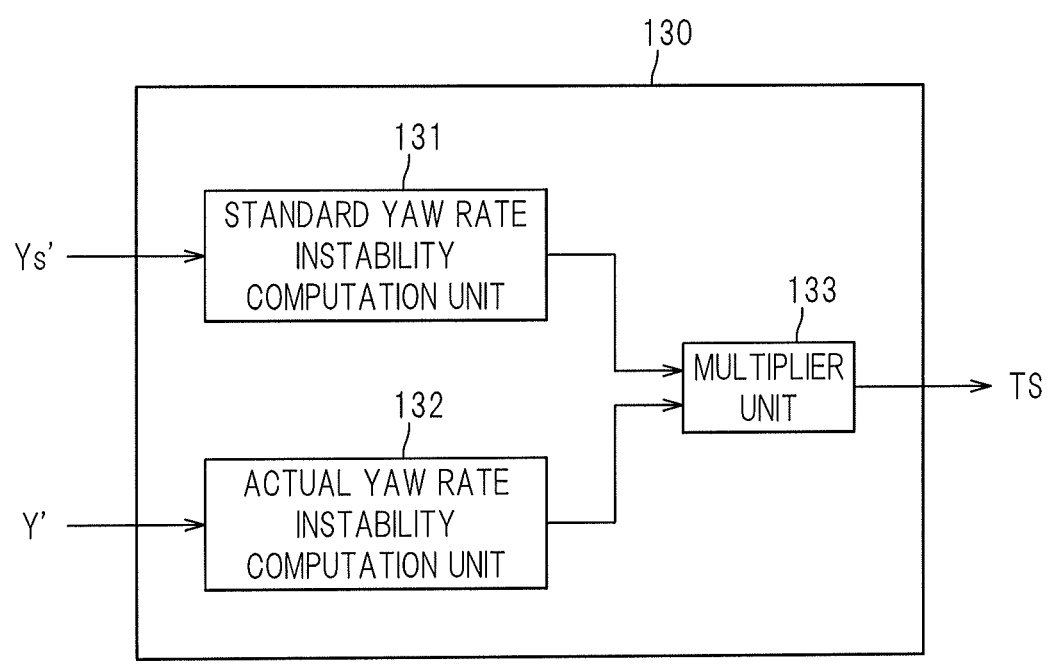
FIG. 5 is a block diagram of an evaluation value computation unit.

As shown in FIG. 5, the evaluation value computation unit 130 includes a standard yaw rate instability computation unit 131, an actual yaw rate instability computation unit 132 and a multiplier unit 133.

The standard yaw rate instability computation unit 131 is configured to compute a standard yaw rate instability value indicative of a continuous fluctuation of the standard yaw rate Ys, based upon a value related to the standard yaw rate Ys. In the present embodiment, the standard yaw rate derivative Ys' is used as the value related to the standard yaw rate Ys to compute the standard yaw rate instability value. To be more specific, an absolute value |Ys'| of the standard yaw rate derivative Ys' is divided by a first initial threshold value and filtered by a low-pass filter for removing abrupt fluctuations to obtain a first filtered value DYs, and if the first filtered value DYs is greater than 1, then the first filtered value DYs is set to the standard yaw rate instability value, while if the first filtered value DYs is not greater than 1, then 1 is set to the standard yaw rate instability value. With this configuration, if the absolute value |Ys'| of the standard yaw rate derivative Ys' is not greater than the first initial threshold value, then the standard yaw rate instability value is 1, while if the absolute value |Ys'| of the standard yaw rate derivative Ys' is greater than the first initial threshold value, then the standard yaw rate instability value is the first filtered value DYs that is greater than 1.

The standard yaw rate instability value is, in short, a value increasing with the degree of rapid steering when the steering wheel ST is operated at speeds higher than a certain extent (to which the absolute value |Ys'| of the standard yaw rate derivative Ys' becomes a value greater than the first initial threshold value). The computed standard yaw rate instability value is outputted to the multiplier unit 133.

The actual yaw rate instability computation unit 132 is configured to compute an actual yaw rate instability value indicative of a continuous fluctuation of the actual yaw rate Y, based upon a value related to the actual yaw rate Y. In the present embodiment, the actual yaw rate derivative Y' is used as the value related to the actual yaw rate Y to compute the actual yaw rate instability value. To be more specific, an absolute value |Y'| of the actual yaw rate derivative Y' is divided by a second initial threshold value and filtered so as to remove abrupt fluctuations to obtain a second filtered value DY, and if the second filtered value DY is greater than 1, then the second filtered value DY is set to the actual yaw rate instability value, while if the second filtered value DY is not greater than 1, then 1 is set to the actual yaw rate instability value. With this configuration, if the absolute value of the actual yaw rate derivative Y' is not greater than the second initial threshold value, then the actual yaw rate instability value is 1, while if the absolute value |Y'| of the actual yaw rate derivative Y' is greater than the second initial threshold value, then the actual yaw rate instability value is the second filtered value DY that is greater than 1.

The actual yaw rate instability value is, in short, a value increasing with the degree of turning (yawing) when the tractor TR is operated to turn (yaw) at speeds higher than a certain extent (to which the absolute value |Y'| of the actual yaw rate derivative Y' becomes a value greater than the second initial threshold value). The computed actual yaw rate instability value is outputted to the multiplier unit 133.

The aforementioned first and second initial threshold values take the same value, in the present embodiment, but they may be different values.

The multiplier unit 133 is configured to compute a steering-back maneuver evaluation value TS based upon the standard yaw rate instability value and the actual yaw rate instability value. To be more specific, the multiplier unit 133 is configured to multiply the standard yaw rate instability value and the actual yaw rate instability value together to thereby obtain a steering-back maneuver evaluation value TS. Accordingly, the steering-back maneuver evaluation value TS has a positive coefficient of correlation with the standard yaw rate instability value and with the actual yaw rate instability value.

In this exemplary embodiment, the steering-back maneuver evaluation value TS is computed based upon both of the value related to the standard yaw rate Ys and the value related to the actual yaw rate Y, but may alternatively be computed based upon either one of these values. For example, only one of the standard yaw rate instability value and the actual yaw rate instability value may be set to the steering-back maneuver evaluation value TS. In an illustrative embodiment where the steering-back maneuver evaluation value TS is computed based upon the both of the value related to the standard yaw rate Ys and the value related to the actual yaw rate Y, the steering-back maneuver evaluation value TS may be appropriate if the value TS is determined to have positive coefficients of correlation with the both of the standard yaw rate instability value and the actual yaw rate instability value; for example, the sum of the standard yaw rate instability value and the actual yaw rate instability value may be computed to thereby obtain the steering-back maneuver evaluation value TS.

Figure 6:
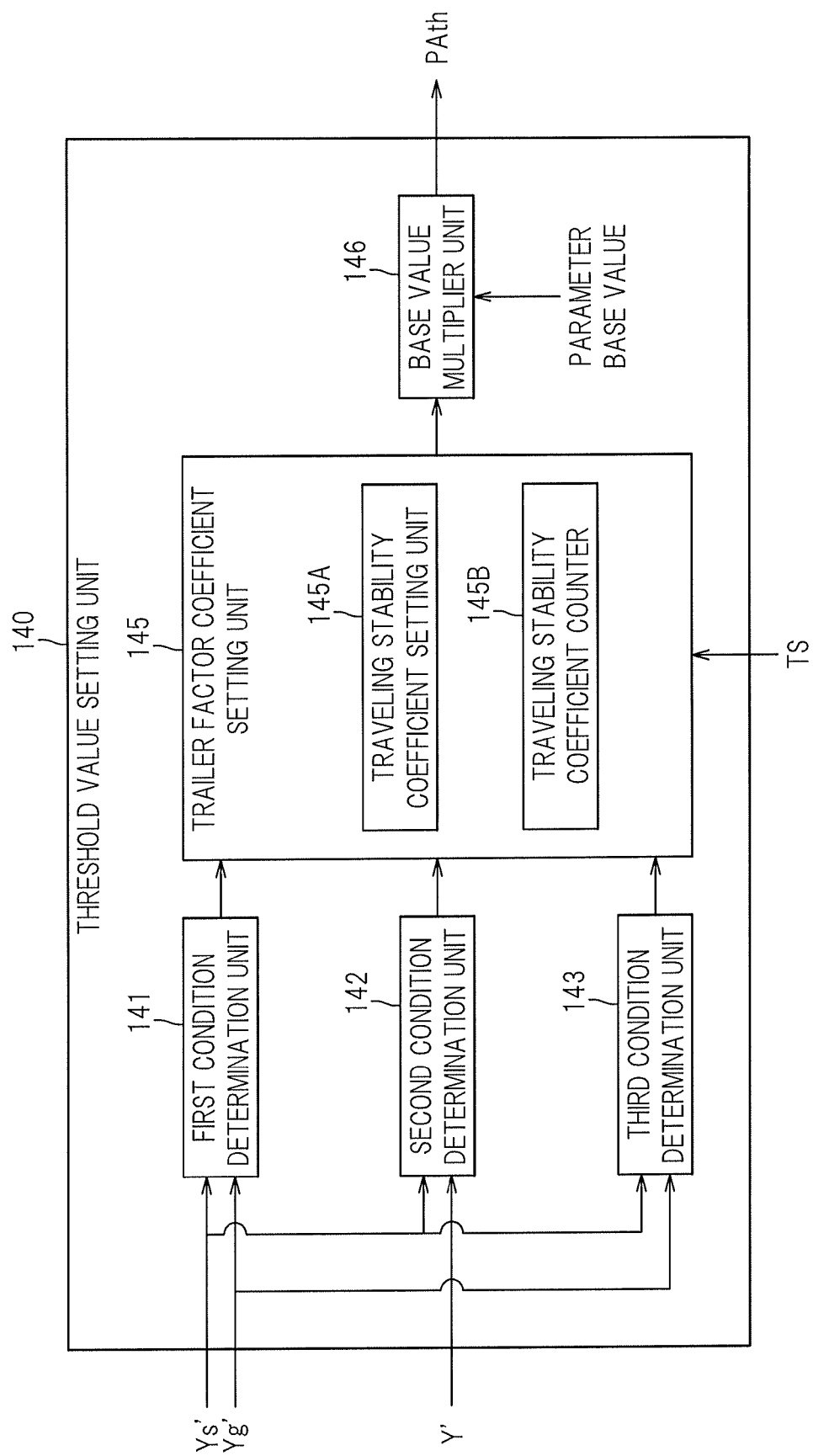
FIG. 6 is a block diagram of a threshold value setting unit.

As shown in FIG. 6, the threshold value setting unit 140 includes a first condition determination unit 141, a second condition determination unit 142, a third condition determination unit 143, a trailer factor coefficient setting unit 145, and a base value multiplier to unit 146.

A first condition for use in the first condition determination unit 141 provides that the value related to the lateral acceleration based yaw rate Yg and the value related to the standard yaw rate Ys have the same sign where each of the values related to the yaw rates (Yg, Ys) has a first sign (e.g., plus sign indicating that the value is positive) exhibited when the tractor turns leftward or has a second sign (e.g., minus sign indicating that the value is negative), opposite to the first sign, exhibited when the tractor turns rightward. The first condition determination unit 141 is configured to determine whether or not the first condition is satisfied. More specifically, this determination may be made by determining whether or not the following inequality is satisfied:

$$Yg' \cdot Ys' > 0$$

where the value related to the lateral acceleration based yaw rate Yg is a lateral acceleration based yaw rate derivative Yg', and the value related to the standard yaw rate Ys is a standard yaw rate derivative Ys'. The result of this determination is outputted to the trailer factor coefficient setting unit 145.

The meaning of the first condition is described herein. When the tractor TR makes a pendular motion due to a swaying motion of the trailer TL, the lateral acceleration based yaw rate Yg and the standard yaw rate Ys tend to be phased to the sides opposite to each other. On the other hand, when the tractor TR in the non-traction state slaloms, these yaw rates Yg, Ys tend to be phased to the same side. Therefore, when a determination is made that the lateral acceleration based yaw rate derivative Yg' and the standard yaw rate derivative Ys' have the same sign, it is assumed that there is a strong possibility that the tractor TR is slaloming in the non-traction state.

A second condition for use in the second condition determination unit 142 provides that an absolute value of a difference between the value related to the standard yaw rate Ys and the value related to the lateral acceleration based yaw rate Yg is smaller than a first predetermined value C1 and an absolute value of a difference between the value related to the standard yaw rate Ys and the value related to the actual yaw rate Y is smaller than a second predetermined value C2. The second condition determination unit 142 is configured to determine whether or not the second condition is satisfied. More specifically, this determination may be made by determining whether or not the following inequalities are both satisfied:

$$|Ys'-Yg'|<C1$$

$$|Ys'-Y'|<C2$$

where the value related to the lateral acceleration based yaw rate Yg is a lateral acceleration based yaw rate derivative Yg', the value related to the standard yaw rate Ys is a standard yaw rate derivative Ys', and the value related to the actual yaw rate Y is an actual yaw rate derivative Y'. The result of this determination is outputted to the trailer factor coefficient setting unit 145.

The meaning of the second condition is described herein. When the tractor TR makes a pendular motion due to a swaying motion of the trailer TL, the quantity of steering is relatively small, but the actual yaw rate Y and the lateral acceleration based yaw rate Yg increase so that the differences thereof from the standard yaw rate Ys becomes larger. On the other hand, when the tractor TR in the non-traction state slaloms, the lateral acceleration based yaw rate Yg and the actual yaw rate Y take values near the standard yaw rate Ys. Therefore, when a determination is made that the absolute value of the difference between the value related to the standard yaw rate Ys (the standard yaw rate derivative Ys', in the present embodiment) and the value related to the lateral acceleration based yaw rate Yg (the lateral acceleration based yaw rate derivative Yg') is smaller than the first predetermined value C1, it is assumed that there is a strong possibility that the tractor TR is slaloming in the non-traction state. Similarly, when a determination is made that the absolute value of the difference between the value related to the standard yaw rate Ys (the standard yaw rate derivative Ys', in the present embodiment) and the value related to the actual yaw rate Y (the actual yaw rate derivative Y', in the present embodiment) is smaller than the second predetermined value C2, it is also assumed that there is a strong possibility that the tractor TR is slaloming in the non-traction state.

A third condition for use in the third condition determination unit 143 provides that an absolute value of the value related to the standard yaw rate Ys is greater than an absolute value of the value related to the lateral acceleration based yaw rate Yg. The third condition determination unit 143 is configured to determine whether or not the third condition is satisfied. More specifically, this determination may be made by determining whether or not the following inequality is satisfied:

$$\text{filtered}|Ys'|>\text{filtered}|Yg'|$$

where the value related to the lateral acceleration based yaw rate Yg is a lateral acceleration based yaw rate derivative Yg', and the value related to the standard yaw rate Ys is a standard yaw rate derivative Ys', the absolute values |Yg'| and |Ys'| are subjected to filtration using a subtraction filter so as to make these values unlikely to decrease. The result of this determination is outputted to the trailer factor coefficient setting unit 145.

The meaning of the third condition is described herein. When the tractor TR slaloms on a road having a low coefficient of friction, the tractor TR would not turn so much according to the amount of steering even if the amount of steering is large. In this situation, the lateral acceleration would not become so great relative to the large amount of steering. Therefore, if a determination is made that the value of the filtered |Ys'| is greater than the value of the filtered |Yg'|, it is assumed that there is a strong possibility that the tractor TR is slaloming on a road having a low coefficient of friction.

The trailer factor coefficient setting unit 145 is configured to determine a trailer factor coefficient K based upon the results of determination as to the first, second and third conditions. The trailer factor coefficient setting unit 145 includes a traveling stability coefficient setting unit 145A and a traveling stability coefficient counter 145B.

In order to set the trailer factor coefficient K, the traveling stability coefficient setting unit 145A is configured to substitute 1 for a traveling stability coefficient $A_n$ (n indicates that it is the current value) if at least one of the first and second conditions is satisfied, and to substitute 0 for the traveling stability coefficient $A_n$ if neither of the first and second conditions is satisfied. This traveling stability coefficient $A_n$ takes 1 at a point of time when there is a small possibility that the change of the actual yaw rate Y is derived from the swaying motion of the trailer TL, and takes 0 at another point of time when there is a strong possibility that the change of the actual yaw rate Y is derived from the swaying motion of the trailer TL, thus changes in sequence, such as 0, 0, 1, 0, 1, 1, ... with time. The control unit 20 stores these traveling stability coefficients $A_{n-1}, A_n, A_{n+1}, \ldots$ at respective points of time in the memory unit.

In order to make the traveling stability coefficient $A_n$ into an easy-to-handle value indicating the possibility that the instability is derived from the swaying motion of the trailer TL, the traveling stability coefficient setting unit 145A is further configured to subject filtration to the traveling stability coefficient $A_n$, for example, using a low-pass filter or the like so as to remove abrupt fluctuations, to thereby obtain a traveling stability coefficient $B_n$. The traveling stability coefficient $B_n$ is a parameter which takes values not less than 0, and not greater than 1. The closer to 0 the traveling stability coefficient $B_n$ is, the more probable it is that the change in the actual yaw rate Y is caused by the swaying motion of the trailer TL. The closer to 1 the traveling stability coefficient $B_n$ is, the less probable it is that the change in the actual yaw rate Y is caused by the swaying motion of the trailer TL.

The traveling stability coefficient counter 145B is configured to increment a count value T if the traveling stability coefficient $B_n$ is greater than a predetermined threshold value C3 or the aforementioned third condition is satisfied, and to decrement the count value C3 otherwise. The count value T has an upper limit (a set upper-limit value $T_{max}$), and if the count value T after increment would be more than the upper limit value $T_{max}$, then the value set as the count value T is $T_{max}$.

The trailer factor coefficient setting unit 145 is further configured to compute a trailer factor coefficient K from this count value T and the steering-back maneuver evaluation value TS. The trailer factor coefficient K is a value indicating whether the change in the actual yaw rate Y is derived from the swaying motion of the trailer TL, and if any change in the trailer factor coefficient K from the normal condition is observed, then it is assumed that the change in the actual yaw rate Y is derived from the swaying motion of the trailer. In the present embodiment, the trailer factor coefficient K is a value which normally takes Kmax and becomes smaller if the actual yaw rate Y changes due to the swaying motion of the trailer TL.

Figure 7:
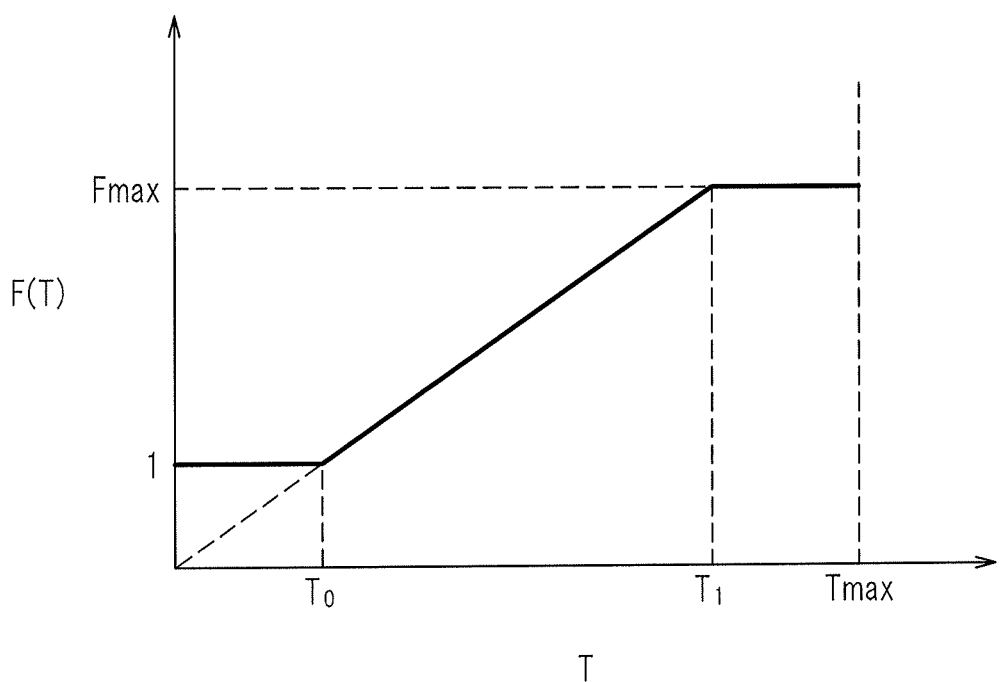
FIG. 7 is a map representing a relationship between count value T and F(T)

The trailer factor coefficient K is set, specifically, by computing F(T) from a count value T based upon a map (function F) as shown in FIG. 7 and multiplying this F(T) by the steering-back maneuver evaluation value TS. Herein, F(T) and the steering-back maneuver evaluation value TS are coefficients for computing the trailer factor coefficient K. The map shown in FIG. 7 for computing F(T) has a characteristic such that F(T) takes 1 up to a predetermined value $T_0$, increases with a constant gradient from $T_0$ to $T_1$, and takes the maximum value Fmax from T1 to $T_{max}$.

The trailer factor coefficient K set (determined) as described above is outputted to the base value multiplier unit 146.

The base value multiplier unit 146 is configured to compute a threshold value PAth based upon trailer factor coefficient K and a parameter base value (a constant stored in advance in the memory unit). To be more specific, the threshold value PAth is computed by multiplying the trailer factor coefficient K by the parameter base value. The parameter base value is a coefficient used to make a final adjustment for comparison of the determination parameter PA with the threshold value PAth, based upon variations among vehicle types or the like. By using this coefficient used to make such an adjustment, the need of changing the determination parameter PA from vehicle type to vehicle type can be obviated.

Since the threshold value PAth is set based upon the trailer factor coefficient K, an increase in the trailer factor coefficient K resulting from a high incidence of determination being made that the first condition, the second condition and/or the third condition (all of them, in some instance) is satisfied causes the threshold value PAth to be changed to a greater value, so that the probability of the determination being made that the pendular motion caused by the swaying motion of the trailer TL is imparted is reduced. Conversely, a decrease in the trailer factor coefficient K resulting from a low incidence of determination being made that the first condition, the second condition or the third condition is satisfied causes the threshold value PAth to be changed to a smaller value, so that the probability of the determination being made that the pendular motion caused by the swaying motion of the trailer TL is imparted is increased. Also, an increase in the trailer factor coefficient K resulting from an increase in the steering-back maneuver evaluation value TS by periodical steering-back maneuvers causes the threshold value PAth to be changed to a greater value, so that the probability of the determination being made that the pendular motion caused by the swaying motion of the trailer TL is imparted is reduced. Conversely, a decrease in the trailer factor coefficient K resulting from a decrease in the steering-back maneuver evaluation value TS causes the threshold value PAth to be changed to a smaller value, so that the probability of the determination being made that the pendular motion caused by the swaying motion of the trailer TL is imparted is increased.

Operation of the motion stabilizer SA for a tractor TR (or a combined vehicle) configured as described above is described hereinbelow.

Figure 8:
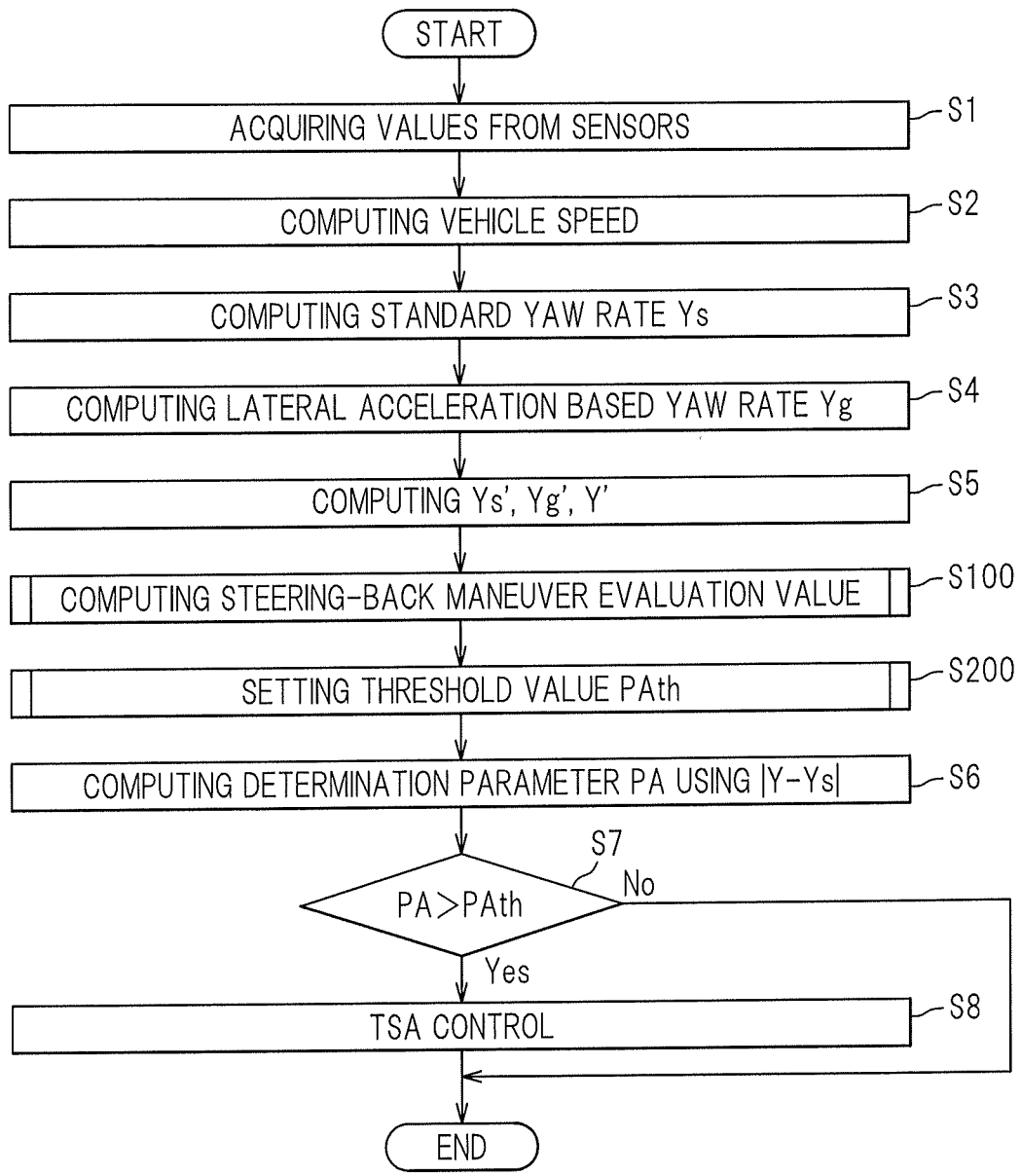
FIG. 8 is a flowchart showing a general flow of operation of the motion stabilizer.

As shown in FIG. 8, the motion stabilizer SA receives (acquires) values of detection results from the wheel speed sensors 91, the steering angle sensor 92, the lateral acceleration sensor 93 and the yaw rate sensor 94 (S1). Then, the vehicle speed computation unit 21 computes a vehicle speed based upon the signals acquired from the wheel speed sensors 91 (S2). Next, the standard yaw rate computation unit 22 computes a standard yaw rate Ys from a steering angle detected by the steering angle sensor 92, and a vehicle speed computed by the vehicle speed computation unit 21 (S3). Furthermore, the lateral acceleration based yaw rate computation unit 23 computes a lateral acceleration based yaw rate Yg from the lateral acceleration detected by the lateral acceleration sensor 93 and the vehicle speed computed by the vehicle speed computation unit 21 (S4).

The derivative computation unit 110 computes derivatives Ys', Yg' and Y' of the standard yaw rate Ys, the lateral acceleration based yaw rate Yg and the actual yaw rate Y (S5).

The evaluation value computation unit 130 computes a steering-back maneuver evaluation value TS from the standard yaw rate derivative Ys' and the actual yaw rate derivative Y' (S100).

Figure 9:
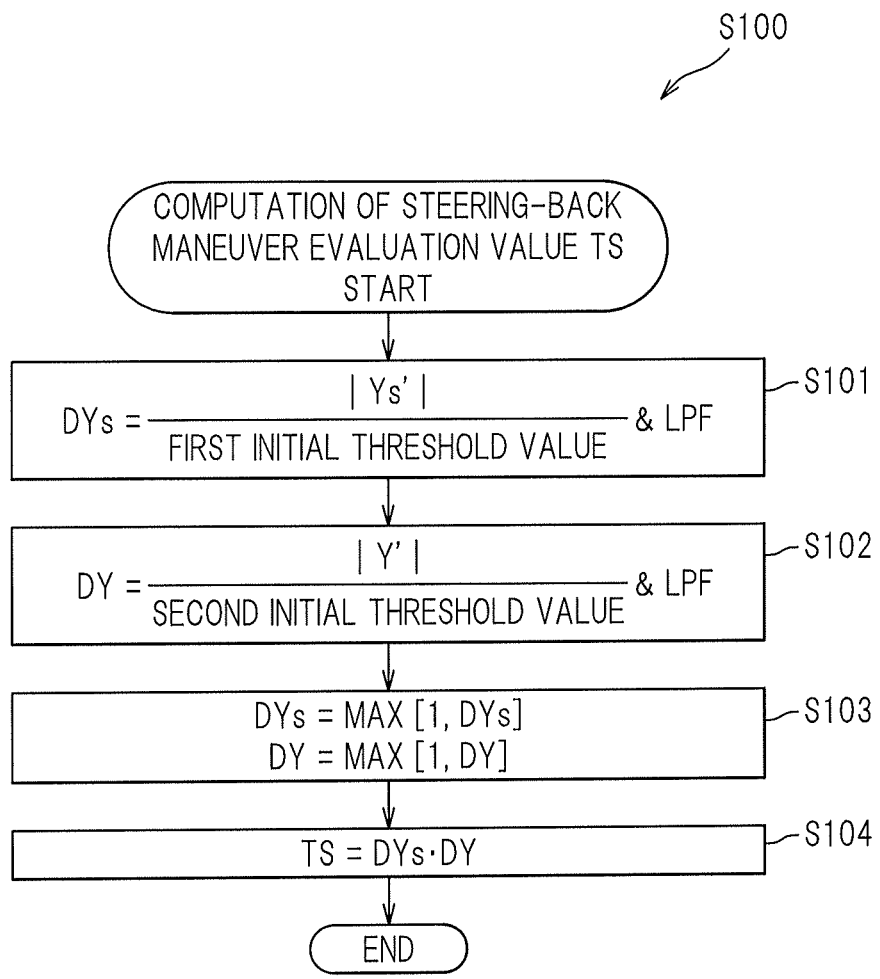
FIG. 9 is a flowchart showing a steering-back maneuver evaluation value computation process.

Computation of the steering-back maneuver evaluation value TS is made following the process steps shown in FIG. 9. First, the standard yaw rate instability computation unit 131 computes a first filtered value DYs by dividing an absolute value |Ys'| of the standard yaw rate derivative Ys' by a first initial threshold value and low-pass filtering the resulting value (S101), and the actual yaw rate instability computation unit 132 computes a second filtered value DY by dividing an absolute value |Y'| of the actual yaw rate derivative Y' by a second initial threshold value and low-pass filtering the resulting value (S102). Next, the standard yaw rate instability computation unit 131 compares DYs with 1 and sets the greater to DYs, and the actual yaw rate instability computation unit 132 compares DY with 1 and sets the greater to DY (S103). Further, the multiplier unit 133 computes a steering-back maneuver evaluation value TS by multiplying DYs and DY together (S104).

On the other hand, as shown in FIG. 8, the threshold value setting unit 140 sets a threshold value PAth (S200).

Figure 10:
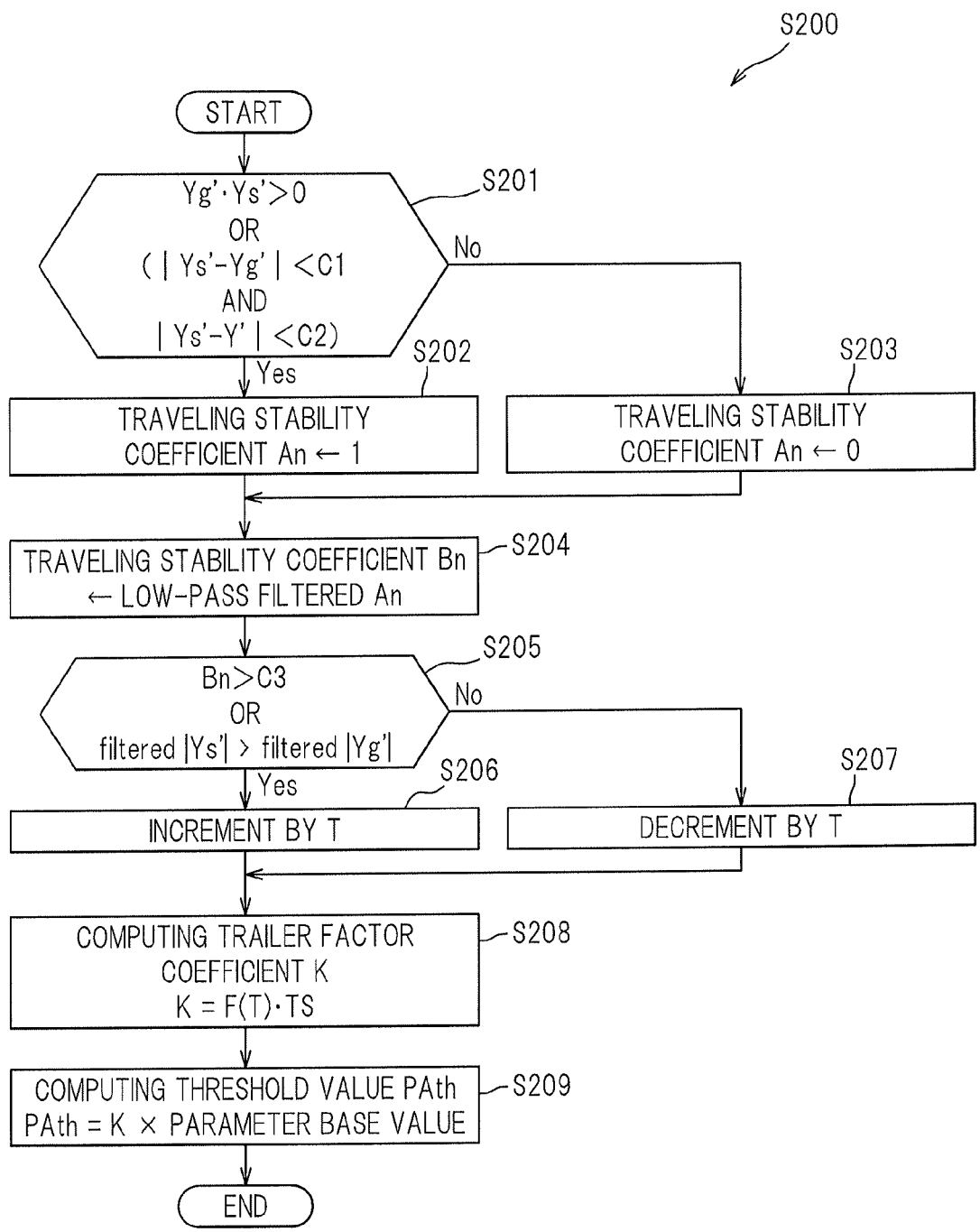
FIG. 10 is a flowchart showing a threshold value computation process.

The threshold value PAth is set by following the process steps shown in FIG. 10. First, the first condition determination unit 141 and the second condition determination unit 142 determine whether or not Yg'·Ys'>0 is satisfied, or |Ys'−Yg'|<C1 and |Ys'−Y'|<C2 are both satisfied (S201). If this condition is satisfied (Yes in S201), then the traveling stability coefficient setting unit 145A sets 1 to the traveling stability coefficient $A_n$ (S202), while if this condition is not satisfied (No in S201), then the traveling stability coefficient setting unit 145A sets 0 to the traveling stability coefficient $A_n$ (S203). Further, in the traveling stability coefficient setting unit 145A, the traveling stability coefficient $A_n$ is low-pass filtered and the resulting value is set to the traveling stability coefficient $B_n$ (S204).

Next, the third condition determination unit 143 determines whether or not the third condition filtered|Ys'|>filtered|Yg'| is satisfied, and if at least one of this third condition and another condition $B_n$>C3 is satisfied (Yes in S205), then the traveling stability coefficient counter 145B increments the count value T (S206), while if neither of these conditions are satisfied (No in S205), then the traveling stability coefficient counter 145B decrements the count value T (S207). Although not illustrated, if the count value T which has incremented becomes greater than Tmax, then Tmax substitutes therefor.

The trailer factor coefficient setting unit 145 computes F(T) from the count value T by referencing to the map shown in FIG. 7, and computes the trailer factor coefficient K by multiplying F(T) by the steering-back maneuver evaluation value TS (S208). Moreover, the base value multiplier unit 146 computes a threshold value PAth by multiplying the trailer factor coefficient K by the parameter base value stored beforehand in the memory unit (S209).

The parameter computation unit 120 subjects the absolute value |Y−Ys| of the yaw rate deviation (difference) to a filter, and computes a determination parameter PA based upon the trailer factor coefficient K (S6). To be more specific, if the trailer factor coefficient K is Kmax, then 0 is set to the determination parameter PA. If the trailer factor coefficient K is between Kmax and $K_1$, then the determination parameter PA is made into a value closer to the filtered |Y−Ys| according as the trailer factor parameter K approaches $K_1$. If the trailer factor coefficient K is $K_1$ or smaller, then the filtered |Y−Ys| is set to the determination parameter PA.

After the determination parameter PA and the threshold value PAth are set as described above, the determination unit 150 compares the determination parameter PA and the threshold value PAth (S7), as shown in FIG. 8. If the determination parameter PA is greater than the threshold value PAth (Yes in S7), then the determination unit 150 determines that the pendular motion due to the swaying motion of the trailer TL is imparted to the tractor TR, and the TSA control unit 25 exercises TSA control (S8). If the determination parameter PA is not greater than the threshold value PAth (No in S7), then the process comes to an end without exercising the TSA control.

Under the control as described above, parameters for the tractor TR changes as will be described below.

FIG. 11 is a timing chart showing changes of parameters effected when the pendular motion caused by the swaying motion of the trailer TL is imparted to the tractor TR. When the pendular motion caused by the swaying motion of the trailer TL is imparted to the tractor TR, the actual yaw rate derivative Y', the lateral acceleration based yaw rate derivative Yg', and the standard yaw rate derivative Ys' all exhibit periodical changes, as shown in FIG. 11 (a). However, since the change in steering is passive, the change of the standard yaw rate derivative Ys' is relatively smaller in comparison with the actual yaw rate derivative Y' and the lateral acceleration based yaw rate derivative Yg'. Furthermore, the actual yaw rate derivative Y', the lateral acceleration based yaw rate derivative Yg', and the standard yaw rate derivative Ys' are considerably out of phase with one another. Under the circumstances, from a point of time when the lateral acceleration based yaw rate derivative Yg' and the standard yaw rate derivative Ys' has opposite signs and an amplitude of the lateral acceleration based yaw rate derivative Yg' and an amplitude of the actual yaw rate derivative Y' start increasing (see broken lines obtained by shifting Ys' in the graph of (a) in FIG. 11 by predetermined amounts corresponding to the first predetermined value C1 and the second predetermined value C2 upward and downward), the computed traveling stability coefficient $B_n$ start decreasing (see (b) in FIG. 11).

The filtered |Yg'| and the filtered |Ys'| for this period of time are shown in FIG. 11 (c) in which the filtered |Yg'| is greater than the filtered |Ys'|. In other words, the third condition is not satisfied, and the probability of the change in the actual yaw rate Y being caused by the swaying motion of the trailer TL is high.

After a time t11, from which the traveling stability coefficient $B_n$ becomes smaller than the predetermined threshold value C3, and the filtered |Yg'| becomes greater than the filtered |Ys'|, the count value T of the traveling stability coefficient counter 145B gradually decreases (see FIG. 11 (d)). Under the circumstances, the steering-back maneuver evaluation value TS remains unchanged at 1 (see FIG. 11 (e)).

Accordingly, the trailer factor coefficient K, which takes the maximum value Kmax (=Fmax) before a time t12, starts decreasing from the time t12 from which the count value T becomes smaller than $T_1$, and becomes 1 at a time t14 at which the count value T becomes $T_0$. The threshold value PAth decreases with the decrease of the trailer factor coefficient K.

On the other hand, the determination parameter PA takes a value of 0 for a period of time (until t12) in which the trailer factor coefficient K remains Kmax, and takes a value of the filtered |Ys−Y| (obtained by subjecting the absolute value of yaw rate deviation to a filter) when the trailer factor coefficient K is a predetermined value $K_1$ or smaller. From the time t12, the threshold PAth decreases according to the change in the trailer factor coefficient K, and the determination parameter increases. Thereafter, the determination parameter PA gradually increases, and exceeds the threshold value PAth at a time t13; at this time, it is determined that the pendular motion caused by the trailer TL is imparted to the tractor TR, and thus the TSA control is started.

As the TSA control causes the pendular motion to gradually become smaller and the traveling stability coefficient $B_n$ to become greater, and if the traveling stability coefficient $B_n$ becomes greater than the threshold value C3 from a time t15, the count value T starts to increment, and the trailer factor coefficient K increases while the threshold value PAth increases. At a time t16 from which the determination parameter PA becomes smaller than the threshold value PAth, and then it is determined that the pendular motion caused by the swaying motion of the trailer TL is not imparted to the tractor TR (that is, the pendular motion has stopped), and the TSA control comes to an end.

Next, change in parameters for the tractor TR slaloming in the non-traction state will now be described with reference to FIG. 12 and FIG. 13.

As shown in FIG. 13 (a), when the tractor IR slaloms in the non-traction state on a road having a high coefficient of friction, the actual yaw rate derivative Y', the lateral acceleration based yaw rate derivative Yg' and the standard yaw rate derivative Ys' change substantially in phase with one another, and take substantially the same values. It is however to be understood that these values slightly vary to some extent when the steering speed is particularly high.

Figure 12:
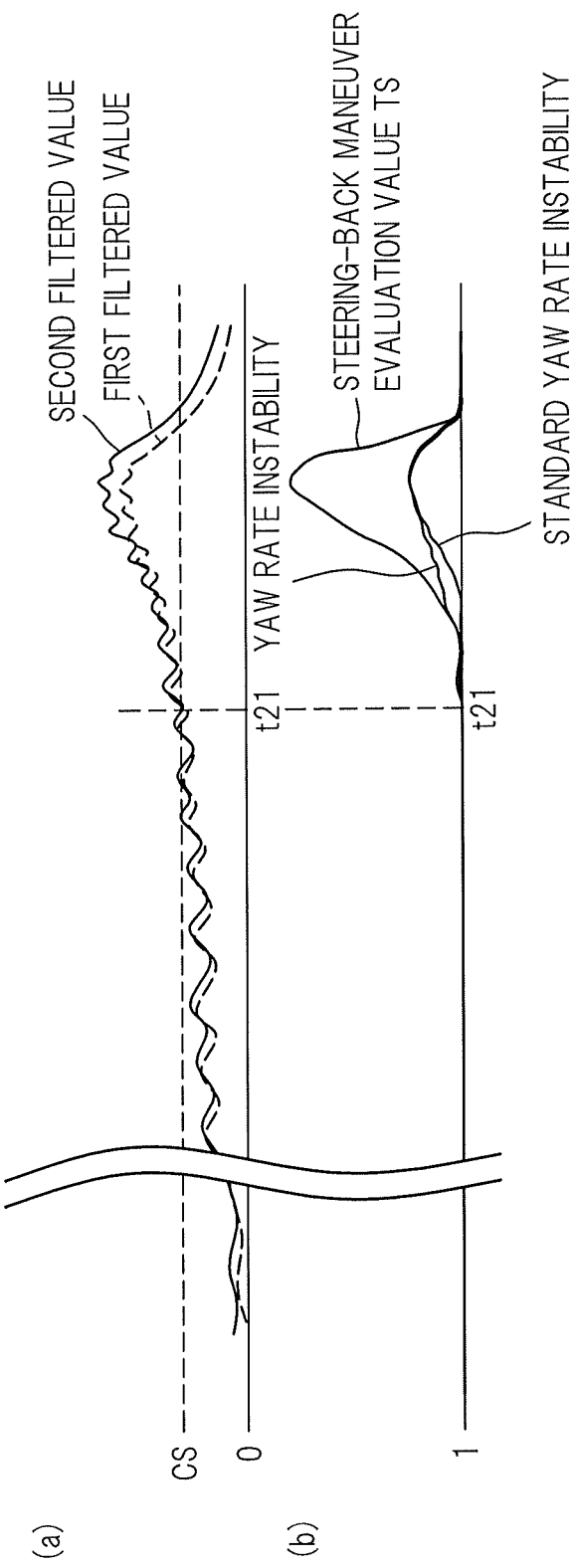
FIG. 12 is a timing chart for explaining a change effected in a steering-back maneuver evaluation value when periodical steering-back maneuvers are made in the no-traction state.

If such a sudden change in steering repeats for a long time, the first filtered value DYs and the second filtered value DY gradually increase as shown in FIG. 12 (a). From a time t21 at which DYs and DY exceed the threshold values CS (the first initial threshold value and the second initial threshold value), the yaw rate instability and the standard yaw rate instability start increasing as shown in FIG. 12 (b), and the steering-back maneuver evaluation value TS which is the product of these instability values drastically increases.

In FIG. 13, the graphs showing changes before a time t21 are omitted to a large extent. In FIG. 13, the incorrect determination of the pendular motion caused by the swaying motion of the trailer TL being imparted to the tractor TR is avoided when the tractor TR in the non-traction state slaloms, as in the changes before the time t21, thanks to the effect of the determination based upon the first, second and third conditions which serve to make the trailer factor coefficient K less likely to become smaller. However, as in the graphs showing the changes after a time t22 in FIG. 13, if an abrupt operation of the steering wheel ST is continuously repeated during slaloming, the traveling stability coefficient $B_n$ becomes small, and the count value T and F(T) becomes small accordingly, with the result that the determination parameter PA becomes great and the threshold value PAth becomes small as shown in the graphs for times t24 to t25 as the case may be. However, since, in the present embodiment, computation of the trailer factor coefficient K involves multiplying of the steering-back maneuver evaluation value TS which indicates the probability of steering-back maneuver being performed periodically, the trailer factor coefficient K becomes considerably greater than 1, and the threshold value PAth does not become so small, so that the determination parameter PA fails to become a value not smaller than the threshold value PAth. Therefore, even when an abrupt and periodical steering-back maneuver is repeated, an incorrect determination that the pendular motion caused by the swaying motion of the trailer TL is imparted to the tractor TR can be prevented.

As described above, according to the present embodiment, the trailer factor coefficient K is computed based upon a correlation of the lateral acceleration based yaw rate derivative Yg' with the standard yaw rate derivative Ys' and a correlation of the actual yaw rate derivative Y' with the standard yaw rate derivative Ys', and the threshold value PAth and the determination parameter PA are changed based upon the trailer factor coefficient K. Accordingly, determination as to whether or not the pendular motion of the tractor TR is caused by the swaying motion of the trailer TL is made with consideration given to the change in the actual yaw rate Y (i.e., whether or not the change is derived by the swaying motion of the trailer TL). Therefore, it is possible to distinguish the pendular motion of the tractor TR caused by the swaying motion of the trailer TL from slaloming of the tractor TR in the non-traction state, and to reduce the possibility of incorrect determination that the tractor TR is making a pendular motion due to the swaying motion of the trailer TL.

In the present embodiment, the lateral acceleration based yaw rate derivative Yg' (as obtained by differentiation of the lateral acceleration based yaw rate Yg), the standard yaw rate derivative Ys' (as obtained by differentiation of the standard yaw rate derivative Ys) and the actual yaw rate derivative Y' (as obtained by differentiation of the actual yaw rate derivative Y) are used as the value related to the lateral acceleration based yaw rate Yg, the value related to the standard yaw rate Ys and the value related to the actual yaw rate Y, respectively. Accordingly, even when the tractor TR is turning (cornering), or when a zero drift is observed in the output signal level of the sensors, the values obtained by differentiation of the yaw rates are not affected by these circumstances, and thus determination can be made adequately as to whether or not the pendular motion of the tractor TR is imparted due to the swaying motion of the trailer TL.

In the present embodiment, computation of the steering-back maneuver evaluation value TS is made based upon both of the continuous change of the standard yaw rate Ys and the continuous change of the actual yaw rate Y. Therefore, the periodical steering-back to maneuvers as observed in the case that the tractor TR is slaloming can be accurately represented in the form of numerical values. Since at least one of the threshold value PAth and the determination parameter PA is changed such that the greater the steering-back maneuver evaluation value TS, the probability of determination as to whether or not the pendular motion is imparted to the tractor TR by the swaying motion of the trailer TL is reduced, the risk of incorrect determination, as to the pendular motion of the tractor TR due to the swaying motion of the trailer TL, can be reduced.

In the present embodiment, the standard yaw rate instability value is increased only if the absolute value of the standard yaw rate derivative Ys' is greater than the first initial threshold value (i.e., only when the possibility of periodical steering-back maneuver of the tractor TR in the non-traction state is high). Accordingly, the pendular motion of the tractor TR due to the swaying motion of the trailer TL can be determined appropriately. Similarly, since the actual yaw rate instability value is increased only if the absolute value of the actual yaw rate derivative Y' is greater than the second initial threshold value (i.e., only when the possibility of periodical steering-back maneuver of the tractor TR in the non-traction state is high), the pendular motion of the tractor TR due to the swaying motion of the trailer TL can be determined appropriately.

Although some illustrative embodiments have been described above, the present invention is not limited to the illustrated embodiments, and those skilled in the art would appreciate that any modifications or changes may be made to any of their specific configurations appropriately without departing from the scope of the present invention.

For example, although the above-described embodiment is configured to change the both of the determination parameter PA and the threshold value PAth based upon the steering-back maneuver evaluation value TS, the traveling stability coefficient $B_n$, the filtered |Ys'|, the filtered |Yg'|, the count value T, the trailer factor coefficient K, etc., an alternative configuration may be feasible in which either one of the determination parameter PA and the threshold value PAth is changed. In other words, the numerical values indicating the probability that the change in the actual yaw rate Y is derived from the swaying motion of the trailer TL may be reflected to either or both of the determination parameter PA and the threshold value PAth.

In the above-described embodiment, the lateral acceleration based yaw rate derivative Yg', the standard yaw rate derivative Ys' and the actual yaw rate derivative Y' are used as the value related to the lateral acceleration based yaw rate Yg, the value related to the standard yaw rate Ys and the value related to the actual yaw rate Y, respectively, but the present invention is not limited to this specific configuration. The lateral acceleration yaw rate Yg, the standard yaw rate Ys, and the actual yaw rate Y may be used as-is, or may be multiplied by any appropriate coefficient if necessary.

What is claimed is:

1. A motion stabilizer for a tractor to which a trailer is connectible, the motion stabilizer comprising:
    a yaw rate acquisition unit configured to acquire an actual yaw rate of the tractor;
    a lateral acceleration acquisition unit configured to acquire a lateral acceleration of the tractor;
    a steering angle acquisition unit configured to acquire a steering angle of the tractor;
    a vehicle speed acquisition unit configured to acquire a vehicle speed of the tractor;
    a lateral acceleration based yaw rate computation unit configured to compute a lateral acceleration based yaw rate that is a yaw rate estimated based upon the lateral acceleration and the vehicle speed;
    a standard yaw rate computation unit configured to compute a standard yaw rate from the steering angle and the vehicle speed; and
    a pendular motion determination unit configured to determine whether or not a pendular motion caused by a swaying motion of the trailer is imparted to the tractor, the pendular motion determination unit including:
        a parameter computation unit configured to compute a determination parameter indicative of a quantity of change in the actual yaw rate;
        a threshold value setting unit configured to compute a threshold value for the determination parameter; and
        a determination unit configured to determine that the pendular motion caused by the swaying motion of the trailer is imparted, if the determination parameter is greater than the threshold value,
    wherein the pendular motion determination unit is configured to make a change to at least one of the threshold value and the determination parameter based upon a correlation of a value related to the lateral acceleration based yaw rate with a value related to the standard yaw rate and a correlation of a value related to the actual yaw rate with a value related to the standard yaw rate.

2. The motion stabilizer according to claim 1, wherein each value related to the yaw rate has a first sign exhibited when the tractor turns leftward or has a second sign, opposite to the first sign, exhibited when the tractor turns rightward, and wherein the change made by the pendular motion determination unit to the at least one of the threshold value and the determination parameter is based upon a first condition which provides that the value related to the lateral acceleration based yaw rate and the value related to the standard yaw rate have the same sign, such that a probability of the determination being made that the pendular motion caused by the swaying motion of the trailer is imparted is reduced if the first condition is satisfied.

3. The motion stabilizer according to claim 1, wherein the change made by the pendular motion determination unit to the at least one of the threshold value and the determination parameter is based upon a second condition which provides that an absolute value of a difference between the value related to the standard yaw rate and the value related to the lateral acceleration based yaw rate is smaller than a first predetermined value and an absolute value of a difference between the value related to the standard yaw rate and the value related to the actual yaw rate is smaller than a second predetermined value, such that a probability of the determination being made that the pendular motion caused by the swaying motion of the trailer is imparted is reduced if the second condition is satisfied.

4. The motion stabilizer according to claim 1, wherein the change made by the pendular motion determination unit to the at least one of the threshold value and the determination parameter is based upon a third condition which provides that an absolute value of the value related to the standard yaw rate is greater than an absolute value of the value related to the lateral acceleration based yaw rate, such that a probability of the determination being made that the pendular motion caused by the swaying motion of the trailer is imparted is reduced if the third condition is satisfied.

5. The motion stabilizer according to claim 1, wherein each value related to the yaw rate to has a first sign exhibited when the tractor turns leftward or has a second sign, opposite to the first sign, exhibited when the tractor turns rightward, and wherein the threshold value setting unit is configured to determine a trailer factor coefficient and to compute the threshold value by multiplying the trailer factor coefficient by a parameter base value that is a predetermined coefficient, the trailer factor coefficient being a value which increases if at least one of a first condition, a second condition and a third condition is satisfied, and decreases if all of the first condition, the second condition and the third condition are not satisfied, where the first condition provides that the value related to the lateral acceleration based yaw rate and the value related to the standard yaw rate have the same sign, the second condition provides that an absolute value of a difference between the value related to the standard yaw rate and the value related to the lateral acceleration based yaw rate is smaller than a first predetermined value and an absolute value of a difference between the value related to the standard yaw rate and the value related to the actual yaw rate is smaller than a second predetermined value, and the third condition provides that an absolute value of the value related to the standard yaw rate is greater than an absolute value of the value related to the lateral acceleration based yaw rate.

6. The motion stabilizer according to claim 5, wherein the threshold value setting unit includes:

a traveling stability coefficient computing unit configured to compute a traveling stability coefficient which increases if at least one of the first condition and the second condition is satisfied, and decreases if none of the first condition and the second condition are satisfied; and a traveling stability coefficient counter configured to increment a count value if the traveling stability coefficient is greater than a third predetermined value or the third condition is satisfied, and to decrement the count value if the traveling stability coefficient is not greater than the third predetermined value and the third condition is not satisfied, wherein the trailer factor coefficient determined by the threshold value setting unit is a value increasing with the count value.

7. The motion stabilizer according to claim 1, wherein the value related to the lateral acceleration based yaw rate is a value obtained by differentiation of the lateral acceleration yaw rate, the value related to the standard yaw rate is a value obtained by differentiation of the standard yaw rate, and the value related to the actual yaw rate is a value obtained by differentiation of the actual yaw rate.

\* \* \* \* \*